(12) United States Patent
Shin

(10) Patent No.: US 11,239,683 B2
(45) Date of Patent: Feb. 1, 2022

(54) TRANSMITTER FOR WIRELESS CHARGING POWER TRANSMISSION, AND METHOD AND SYSTEM FOR CONNECTION BETWEEN INTERNET OF THINGS SYSTEM AND WIRELESS CHARGING RECEIVER

(71) Applicant: NHN Corporation, Gyeonggi-do (KR)

(72) Inventor: Hee Jea Shin, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 165 days.

(21) Appl. No.: 16/669,559

(22) Filed: Oct. 31, 2019

(65) Prior Publication Data
US 2020/0144846 A1 May 7, 2020

(30) Foreign Application Priority Data
Nov. 1, 2018 (KR) .................. 10-2018-0132712

(51) Int. Cl.
| | |
|---|---|
| H02J 7/00 | (2006.01) |
| H02J 7/02 | (2016.01) |
| H02J 50/80 | (2016.01) |
| H02J 50/12 | (2016.01) |
| H02J 50/60 | (2016.01) |

(52) U.S. Cl.
CPC .............. *H02J 7/025* (2013.01); *H02J 50/12* (2016.02); *H02J 50/80* (2016.02); *H02J 7/00045* (2020.01); *H02J 50/60* (2016.02)

(58) Field of Classification Search
USPC ............................................... 320/106–115
See application file for complete search history.

(56) References Cited

U.S. PATENT DOCUMENTS

| | | | |
|---|---|---|---|
| 2017/0070101 A1* | 3/2017 | Kim | H02J 50/12 |
| 2017/0126070 A1* | 5/2017 | Lee | H02J 7/025 |
| 2018/0301940 A1* | 10/2018 | Yeo | H02J 50/40 |

FOREIGN PATENT DOCUMENTS

KR   10-2017-0064314   6/2017

* cited by examiner

*Primary Examiner* — Binh C Tat
(74) *Attorney, Agent, or Firm* — Ladas & Parry, LLP

(57) ABSTRACT

A transmitter for wireless charging power transmission comprises a transmitter-side power converting unit converting power of an input Alternating Current (AC) signal and outputting the converted AC signal; a transmitter-side resonant circuit unit generating a magnetic field based on the converted AC signal and providing power to a receiver located within a charging area; and a transmitter-side processor controlling power conversion of the transmitter-side power converting unit and performing impedance matching of the transmitter-side resonant circuit unit. The transmitter-side processor detects an object located within the charging area, generate a wireless power signal and output the generated wireless power signal to the transmitter-side power converting unit, recognizes the object as a receiver if modulation of the wireless power signal associated with the object is detected, receives identification information of the receiver, connects to the receiver for wireless charging power transmission based on charging authentication information included in the identification information, transmits IoT authentication information included in the identification information to an IoT system to enable the receiver to subscribe to the IoT system, and transmits wireless charging power to the receiver.

19 Claims, 12 Drawing Sheets

TRANSMITTER FOR WIRELESS CHARGING POWER TRANSMISSION, AND METHOD AND SYSTEM FOR CONNECTION BETWEEN INTERNET OF THINGS SYSTEM AND WIRELESS CHARGING RECEIVER

CROSS REFERENCE TO RELATED APPLICATION(S)

This application claims the priority to Korean Patent Application No. 10-2018-0132712, filed on Nov. 1, 2018, which is all hereby incorporated by reference in its entirety.

BACKGROUND

Technical Field

The present disclosure generally relates to a transmitter for wireless charging power transmission and a method and a system for connecting a wireless charging receiver to an Internet of Things (IoT) system by using a wireless charging transmitter.

Related Art

The "Internet of Things (IoT)" may refer to interconnection of embedded devices that may be identified uniquely within the Internet infrastructure. Ultimately, the IoT, in fact, creates a new, wide range of applications where an arbitrary type of a physical object may provide information about the physical object itself or surroundings thereof and/or may be controlled remotely by a client device via the Internet.

The development and adoption of the IoT was slow due to the issues related to lack of connectivity, power, and standardization. For example, one of obstacles to the IoT development and adoption is that there is no relevant standard platform which allows developers to design and provides new IoT devices and services. To connect a new device to the IoT system, the developers have to understand the entire IoT platform from the start to the end, including network protocols and infrastructure, hardware, software, and services required to support desired IoT implementation. Moreover, considering the general industry practice where each provider of IoT devices employs proprietary technologies for designing and connecting the IoT devices, it becomes burdensome for end users to adopt various types of IoT devices. Another obstacle to the IoT adoption is the difficulty in connecting and powering the IoT devices. For example, it is by no means convenient to establish a configuration relationship for a device such as refrigerator, garage door opener, environment sensor, or home security sensor/controller with respect to other devices to connect the device to the IoT system, and there is a burden to configure each and every device to be connected. Moreover, an electric power source for powering each connected IoT device is required, which is often not readily found at convenient locations.

It is with respect to these and other general considerations that the following embodiments have been described. Also, although relatively specific problems have been discussed, it should be understood that the embodiments should not be limited to solving the specific problems identified in the background.

PRIOR ART REFERENCES

Patents (Patent 001) Korean Patent Application Publication No. 10-2017-0064314

SUMMARY

Various embodiments of the present disclosure may provide a method and a system for establishing a connection between a wireless charging receiver and an IoT system which may enhance convenience of performing network connection and configuration for interaction between various devices within the IoT system and a new device.

Some embodiments of the present disclosure may provide a device, a method, and a system which, when various battery-operated devices are charged wirelessly, may seamlessly connect other devices linked to the various devices and thereby allow an IoT system to be implemented and used conveniently.

Certain embodiments of the present disclosure may provide a device, a method, and a system which use data exchanged during a communication process between a transmitter and a receiver for wireless power charging to enable the receiver to be connected to an IoT system, thereby improving usage of the legacy wireless charging network.

According to an embodiment of the present disclosure, a transmitter for wireless charging power transmission may comprise a transmitter-side power converting unit converting power of an input AC signal and outputting the converted AC signal; a transmitter-side resonant circuit unit generating a magnetic field based on the AC signal outputted from the transmitter-side power converting unit and providing power to a receiver located within a charging area; and a transmitter-side processor controlling power conversion of the transmitter-side power converting unit and performing impedance matching of the transmitter-side resonant circuit unit, wherein the transmitter-side processor is configured to detect an object located within the charging area, generate a wireless power signal and output the generated wireless power signal to the transmitter-side power converting unit, recognize the object as a receiver if modulation of the wireless power signal due to the object is detected, receive identification information of the receiver, establish a connection to the receiver for wireless charging power transmission based on charging authentication information within the identification information, transmit IoT authentication information within the identification information to an IoT system to enable the receiver to subscribe to the IoT system, and transmit wireless charging power to the receiver.

According to a different aspect of the transmitter for wireless charging power transmission, the transmitter-side processor detects change of an amount of power for generating a wireless power signal in the transmitter-side power converting unit and detecting the object located within a charging area.

According to a different aspect of the transmitter for wireless charging power transmission, the transmitter-side processor detects the object by monitoring change of magnetic flux in a charging area, change of capacitance or inductance between the object and the transmitter, or shift of resonance frequency.

According to a different aspect of the transmitter for wireless charging power transmission, the transmitter-side processor recognizes the object as the receiver by acquiring a power control message from demodulation of a modulation signal of the wireless power signal received from the object.

According to a different aspect of the transmitter for wireless charging power transmission, if a temperature detected in the charging area exceeds a preconfigured temperature, the transmitter-side processor controls a display function of the receiver and/or an operation of the receiver due to interconnection between the receiver and the IoT system.

According to a different aspect of the transmitter for wireless charging power transmission, the transmitter-side processor transmits the IoT authentication information and received security authentication information to the IoT system so that at least part of functions due to connection of the receiver to a predetermined device within the IoT system or due to interaction between the receiver and the predetermined device may be additionally activated.

According to a different aspect, a transmitter for wireless charging power transmission may comprise a transmitter-side power converting unit converting power of an input AC signal and outputting the converted AC signal; a transmitter-side resonant circuit unit generating a magnetic field based on the AC signal outputted from the transmitter-side power converting unit and providing power to a receiver located within a charging area; and a transmitter-side processor controlling power conversion of the transmitter-side power converting unit and performing impedance matching of the transmitter-side resonant circuit unit, wherein the transmitter-side processor is configured to detect an object by transmitting a short beacon signal periodically, transmit a long beacon signal for driving an object, recognize the object as a receiver by receiving advertisement from the object which has responded to reception of the long beacon signal, transmit a connection request signal to the receiver, exchange parameter information with the receiver which has received the connection request signal, establish a connection to the receiver for wireless charging power transmission based on charging authentication information within the parameter information received from the receiver, transmit IoT authentication information within the parameter information to an IoT system to enable the receiver to subscribe to the IoT system, and transmit wireless charging power to the receiver.

According to a different aspect of transmitter for wireless charging power transmission, the transmitter-side processor detects the object by detecting reactance or resistance of input impedance or change of the input impedance of the transmitter-side resonant circuit unit.

According to a different aspect of the transmitter for wireless charging power transmission, the transmitter-side processor transmits the IoT authentication information to the IoT system after establishing the connection for wireless charging power transmission.

According to a different aspect of the transmitter for wireless charging power transmission, the parameter information includes static parameter information which is static status information indicating the receiver status and dynamic parameter information which is change information changing according to the receiver status, and the static parameter information includes the IoT authentication information.

According to a different aspect of the transmitter for wireless charging power transmission, the transmitter-side processor transmits the IoT authentication information and received security authentication information to the IoT system so that at least part of functions due to connection of the receiver to a predetermined device within the IoT system or due to interaction between the receiver and the predetermined device may be additionally activated.

According to a different aspect of the transmitter for wireless charging power transmission, if a temperature detected in the charging area exceeds a preconfigured temperature, the transmitter-side processor controls a display function of the receiver and/or an operation of the receiver due to interconnection between the receiver and the IoT system.

According to a different aspect of the present disclosure, a method for establishing a connection between an IoT system and a wireless charging receiver may comprise an object detection step in which a transmitter detects an object located within a charging area of the transmitter to which wireless charging power may be transmitted; a receiver detection step in which the transmitter outputs a receiver detection signal; a receiver recognition step in which the transmitter receives, from the receiver, a receiver confirmation signal which is a response signal to the receiver detection signal and recognizes the object as a receiver; a receiver identification step in which the transmitter identifies the receiver by receiving, from the receiver, identification and configuration information including IoT authentication information and charging authentication information; a charging connection establishment step in which the transmitter establishes a connection to the receiver based on the charging authentication information; an IoT connection establishment step in which the transmitter transmits the IoT authentication information to the IoT management device to enable the receiver to subscribe to an IoT system; and a wireless charging step in which the transmitter transmits the wireless charging power to the receiver.

According to a different aspect of the method for establishing a connection between an IoT system and a wireless charging receiver, if a charging status of the receiver exceeds a preconfigured amount of charging, the transmitter transmits the IoT authentication information to the IoT system.

According to a different aspect of the method for establishing a connection between an IoT system and a wireless charging receiver, the method further comprises a step in which the transmitter receives security authentication information, and in the IoT connection establishment step, the transmitter transmits IoT authentication information including the security authentication information to the IoT system, wherein the security authentication information is information used by the receiver to establish a security connection to at least one device within the IoT system.

According to a different aspect of the method for establishing a connection between an IoT system and a wireless charging receiver, in the IoT connection establishment step, if the transmitter determines that reception time of the security authentication information is within a preconfigured time from the detection time of the receiver, the transmitter transmits IoT authentication information including the security authentication information to the IoT system.

According to a different aspect of the method for establishing a connection between an IoT system and a wireless charging receiver, to connect the receiver to at least one device determined based on location information of the transmitter among a plurality of devices within the IoT system, in the IoT connection establishment step, the transmitter transmits unique information of the transmitter to the IoT management device.

According to a different aspect of the method for establishing a connection between an IoT system and a wireless charging receiver, the method further comprises a step in which the transmitter receives an additional receiver connection request signal from the IoT management device; and a step in which the transmitter recognizes the additional receiver and transmits IoT authentication information corresponding to the additional receiver to the IoT management device, thereby allowing the receiver to be connected to additional devices within the IoT system.

According to a different aspect of the method for establishing a connection between an IoT system and a wireless charging receiver, the method further comprises a step in which the transmitter monitors temperature information of the receiver; a step in which the transmitter compares a temperature of the receiver with a preconfigured first temperature value; and a step in which, if the temperature of the receiver exceeds the first temperature value, the transmitter transmits a control signal for stopping interworking of the receiver with other devices within the IoT system to the IoT management device.

According to a different aspect of the method for establishing a connection between an IoT system and a wireless charging receiver, the method further comprises a step in which the transmitter compares a temperature of the receiver with a preconfigured second temperature value and a step in which, if the temperature of the receiver exceeds the second temperature value, the transmitter stops wireless power transmission, wherein the second temperature value is larger than the first temperature value.

This summary is provided to introduce a selection of concepts in a simplified from that are further described below in the Detailed Description. This summary is not intended to identify key features or essential features of the claimed subject matter, nor is it intended to be used to limit the scope of the claimed subject matter.

DESCRIPTION OF EXEMPLARY EMBODIMENTS

Figure 1:
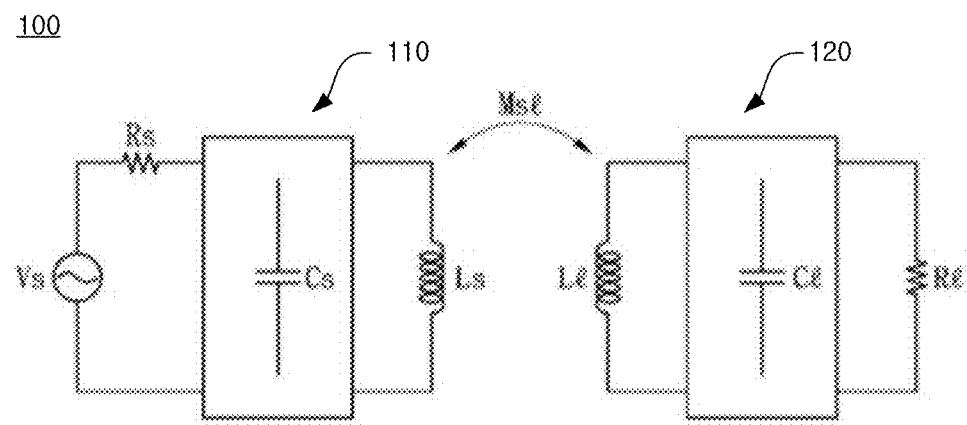
FIG. 1 illustrates a conceptual diagram of a magnetic induction equivalent circuit according to an embodiment of the present disclosure.

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms. Also, a singular expression should be understood to indicate a plural expression unless otherwise explicitly stated. The term "include" or "have" is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, various embodiments of the present disclosure will be described in detail with reference to appended drawings. Throughout the specification, the same or corresponding constituting element is assigned the same reference number, and repeated descriptions thereof will be omitted.

According to some embodiments of the present disclosure, a wireless charging receiver receiving power wirelessly through a wireless charging transmitter may be allowed to be connected to an IoT system when the wireless charging receiver subscribes or is connected to a wireless charging network.

According to certain embodiments of the present disclosure, a wireless charging receiver may be applied to various industry fields such as mobile phone industry, smart watch industry, computer and notebook industry, home appliance industry, electric vehicle industry, medical device industry, and robot industry, which employ electronic devices using or requiring batteries.

According to some embodiments of the present disclosure, a wireless charging transmitter may take into account a system capable of transmitting power to one or more devices by using one or more transmission coils.

According to an embodiment of the present disclosure, a battery shortage problem in mobile devices such as smartphones and notebook computers may be solved. For example, if a user uses a smartphone or a notebook computer on a wireless charging pad placed on a table, battery of the smartphone or the notebook computer may be charged automatically, and an IoT system linked to the smartphone or the notebook computer may be driven. Also, if the wireless charging pad is installed in a public place such as a cafeteria, airport, taxi, office, or restaurant, various types of mobile devices may be charged regardless of their types of charging ports varying for individual mobile device manufacturers, and at the same time, interaction with various other devices installed in the public space is also allowed through interworking with the mobile devices. Also, if the wireless power transfer technology is applied to household appliances such as a vacuum cleaner or an electric fan, it may not be necessary to bother to look for a power cable, and complicated wiring may disappear, which leads to reduction of wiring within a building and increases space utilization. Moreover, a smart environment may be realized through interaction between household appliances and other devices. Also, although it takes a considerable time to charge an electric vehicle via the current household power, if high power is transferred through the wireless power transfer technology, the charging time may be reduced; furthermore, if a wireless charging facility is installed on the parking lot, an inconvenience of having to prepare a power cable around an electric vehicle may be removed, and through a connection to other nearby devices, various smart vehicle system environments may be realized for the electric vehicle being charged wirelessly. Besides, embodiments of the present disclosure may increase efficiency of system management, allow comprehensive monitoring of various types of information, and allow a smarter technology environment to be realized through systematic interworking among various devices. Also, in case a transmitter is located near the driver seat of a vehicle, and a receiver is the terminal of a driver, if the driver gets into the vehicle and charges his or her terminal wirelessly through the transmitter, various functions of the vehicle may be performed, and various smart environments may be provided to the driver via various kinds of interaction with the terminal. Also, according to whether a terminal, which is a receiver, is placed on a transmitter at home or whether a car key, which is another receiver, is placed together with the terminal on the transmitter, different IoT environments may be established to realize various operating environments from the viewpoint of security or convenience.

The terms and abbreviations used in the embodiments are as follows.

Wireless Power Transfer System: may be a system that provides wireless power transfer within a magnetic field.

Wireless Power Transfer System-Charger; Power Transfer Unit (PUT): may be a device that provides power wirelessly to a power receiver within a magnetic field and manages the whole system, which may be referred to as a transmitter or a transmission device.

Wireless Power Receiver System-Device; Power Receiver Unit (PRU): may be a device that receives power wirelessly from a power transmitter within a magnetic field, which may be referred to as a receiver or a reception device.

Charging Area: may be an area within a magnetic field, where wireless power transfer actually takes place. The charging area may be varied depending on the size, required power, and operating frequency of an application product.

Internet of Things (IoT) System: may be a system comprising devices interacting with each other through wired or wireless communication. Devices exchange data with each other to provide a user with the information that the devices have analyzed and learned and implement various functions through interaction of all or part of the devices.

IoT management device: may be a device constituting an IoT system, which supervises or controls interaction of a plurality of devices.

Scattering parameter (S parameter): may refer to the ratio of input voltage to output voltage over a frequency distribution, which is determined by the ratio of an input port to an output port (Transmission; S21) or a self-reflection value of each input/output port, namely an output value reflected back by an input to the port itself (Reflection; S11, S22).

Quality index Q (Q factor): may be Q factor at the resonance describes quality of frequency selection. A higher Q factor indicates better resonance characteristics, where the Q factor is expressed by the ratio of energy stored in a resonator to energy lost.

Looking at the principles of wireless power transmission, it operates based on the magnetic induction and magnetic resonance principles.

The magnetic induction method, which underpins the non-contact energy transfer technology, describes the phenomenon that when a source inductor (Ls) and a load inductor (Ll) are placed close to each other, and current flows into the source inductor (Ls), an electromotive force is developed in the load inductor (Ll) from the magnetic flux generated as the current flows into the source inductor (Ls). On the other hand, the magnetic resonance principle relies on coupling of two resonators. Wireless energy transfer is operated according to the resonance phenomenon where magnetic resonance is generated due to the natural frequency between the two resonators, and the two resonators resonate at the same frequency and develop electric and magnetic fields over the same wavelength range.

FIG. 1 illustrates a conceptual diagram of a magnetic induction equivalent circuit according to an embodiment of the present disclosure.

Referring to FIG. 1, a transmitter 110 in the magnetic induction equivalent circuit 100 may be implemented by using a voltage source (Vs) which is a device supplying power, a source resistor (Rs), a source capacitor (Cs) for impedance matching, and a source coil (Ls) for magnetic coupling to a receiver 120.

The receiver 120 may comprise a load resistor (Rl), which represents the equivalent resistance of the receiver 120, a load capacitor (Cl) for impedance matching, and a load coil (Ll) for magnetic coupling to the transmitter 110.

The degree of coupling between the source coil (Ls) and the load coil (Ll) may be expressed by mutual inductance (Msl).

In FIG. 1, the ratio (S21) of input voltage to output voltage is obtained from the magnetic induction equivalent circuit consisting only of coils without the source capacitor (Cs) and the load capacitor (Cl) for impedance matching. From the obtained ratio (S21), a condition for the maximum power transfer is sought, which satisfies Equation 1 below.

$$Ls/Rs = Ll/Rl \qquad \text{[Equation 1]}$$

According to Equation 1, when the ratio of the inductance of the transmitter coil (Ls) to the source resistance (Rs) equals the ratio of the inductance of the load coil (Ll) to the load resistance of the load resistor (Rl), maximum power transfer may be achieved. In a system having only inductance, without any capacitor that may be used to compensate for reactance, the value of self-reflectance (S11) of the input/output port may not be zero at the condition where the maximum power transfer is achieved, and according to the value of mutual inductance (Msl), power transfer efficiency may be changed considerably. Therefore, the source capacitor (Cs) may be added to the transmitter 110 as a compensating capacitor for impedance matching, and the load capacitor (Cl) may be added to the receiver 120. As an example, the compensating capacitors (Cs, Cl) may be connected in series or in parallel to each of the reception coil (Ls) and the load coil (Ll). Also, for impedance matching, not only the compensating capacitors but also passive components such as additional capacitors and inductors may be added to each of the transmitter and the receiver.

Figure 2:
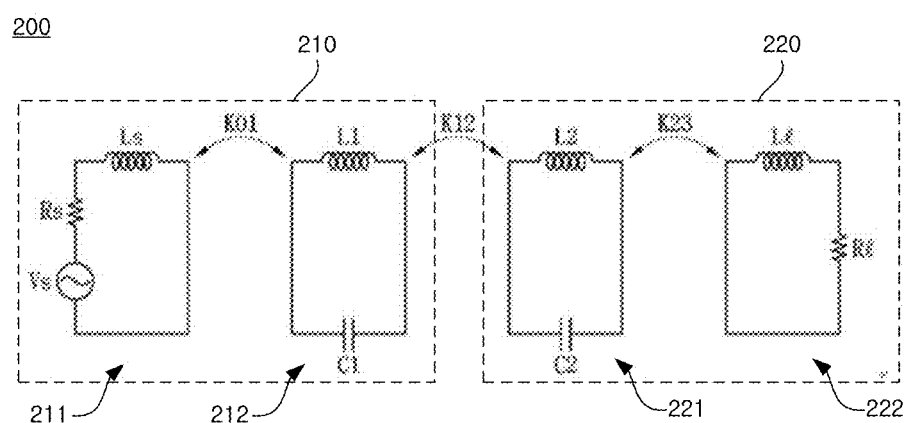
FIG. 2 illustrates a conceptual diagram of a magnetic resonance equivalent circuit according to an embodiment of the present disclosure.

FIG. 2 illustrates a conceptual diagram of a magnetic resonance equivalent circuit according to an embodiment of the present disclosure.

Referring to FIG. 2, a transmitter 210 in the magnetic resonant equivalent circuit 200 may be implemented by using a source coil 211 forming a closed-loop circuit through a series connection of a voltage source (Vs), a source resistor (Rs), and a source inductor (Ls); and a transmitter-side resonant coil 212 forming a closed-loop circuit through a series connection of a transmitter-side resonant inductor (L1) and a transmitter-side resonant capacitor (C1).

A receiver 220 may be implemented by using a load coil 221 forming a closed-loop circuit through a series connection of a load resistance (Rl) and a load coil; and a receiver-side resonant coil 222 forming a closed-loop circuit through a series connection of a receiver-side resonant inductor (L2) and a receiver-side resonant capacitor (C2).

The source inductor (Ls) and the transmitter-side inductor (L1) are magnetically coupled with a coupling coefficient of K01, the load inductor (Ll) and the load-side resonant inductor (L2) are magnetically coupled with a coupling coefficient of K12, and the transmitter-side resonant inductor (L2) and the receiver-side resonant inductor (L1) are magnetically coupled with a coupling coefficient of K23.

In another embodiment, the source coil and/or load coil may be omitted but consist only of the transmitter-side resonant coil and the receiver-side resonant coil.

The magnetic resonance scheme may improve power transfer efficiency since most of the energy in the resonator of the transmitter is transferred to the resonator of the receiver when the resonant frequencies of the two resonators are the same. The efficiency of the magnetic resonance scheme is improved when Equation 2 below is satisfied.

$k/\Gamma >> 1$ ($k$ is a coupling coefficient, and $\Gamma$ is an attenuation rate) [Equation 2]

To increase efficiency of the magnetic resonance scheme, components for impedance matching may be added, where impedance matching components may be passive components such as inductors and capacitors.

Based on the wireless power transfer principles above, a wireless power transfer system for transferring power according to the magnetic induction or magnetic resonance scheme will be described.

<Transmitter>

Figure 3A:
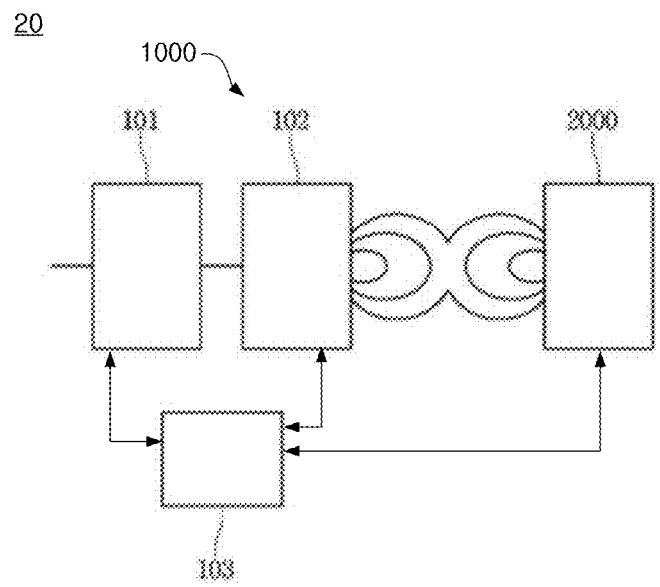
FIGS. 3a and 3b show block diagrams of a transmitter, one of subsystems comprised in a wireless power transfer system, according to embodiments of the present disclosure.
Figure 3B:
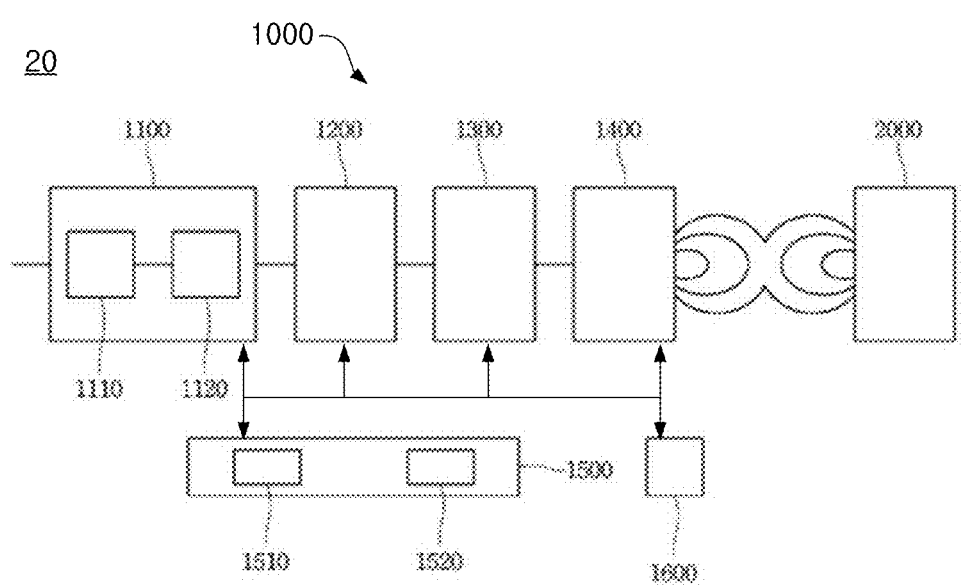

FIGS. 3a and 3b are block diagrams of a transmitter, one of subsystems included in a wireless power transfer system, according to embodiments of the present disclosure.

Referring to FIG. 3a, a wireless power transfer system 20 according to an embodiment of the present disclosure may include a transmitter 1000 and a receiver 2000 receiving power wirelessly from the transmitter 1000.

The transmitter 1000 may include a transmitter-side power converting unit 101, a transmitter-side resonant circuit unit 102, and a transmitter-side processor 103.

The transmitter-side power converting unit 101 may be configured to convert power of an input Alternating Current (AC) signal and output the converted AC signal.

The transmitter-side resonant circuit unit 102 may be configured to generate a magnetic field based on the AC signal outputted from the transmitter-side power converting unit 101 and provide power to the receiver 2000 located within a charging area.

The transmitter-side processor 103 may be configured to control power conversion of the transmitter-side power converting unit 101 and adjust the amplitude and frequency of an output signal of the transmitter-side power converting unit 101. Also, the transmitter-side processor 103 may be configured to perform the impedance matching of the transmitter-side resonant circuit unit 102. Also, the transmitter-side processor 103 may configured to sense impedance, voltage, and current information from the transmitter-side power converting unit 101 and the transmitter-side resonant circuit unit 102, and communicate with the receiver 2000 wirelessly.

The transmitter-side power converting unit 101 may include one or more of a power converting unit converting a first AC signal to a Direct Current (DC) signal, a power converting unit varying the level of the DC signal and outputting the DC signal, and a power converting unit converting the DC signal to a second AC signal. And, the transmitter-side resonant circuit 102 may include a coil and an impedance matching unit that resonates with the coil. Also, the transmitter-side processor 103 may include a sensing unit for sensing impedance, voltage, and current information, and a wireless communication unit.

Also, referring to FIG. 3b, the transmitter 1000 may include a transmitter-side AC/DC converting unit (or convertor) 1100, a transmitter-side DC/AC converting unit (or convertor) 1200, a transmitter-side impedance matching unit 1300, a transmitter-side coil 1400, and a transmitter-side communication and control unit 1500.

The transmitter-side AC/DC converting unit 1100 may be a power converting unit that converts an AC signal provided from an outside, or inputted to the transmitter-side AC/DC converting unit 1100, to a DC signal according to the control of the transmitter-side communication and control unit 1500.

The transmitter-side AC/DC converting unit 1100 may include a rectifier 1110 and a transmitter-side DC/DC converting unit 1120 as sub-systems.

The rectifier 1110 may be a system that is configured to convert a provided AC signal to a DC signal.

The rectifier 1110 may be implemented by a diode rectifier exhibiting a relatively high efficiency when operated at high frequency, a synchronous rectifier that may be integrated into one-chip, or a hybrid rectifier with cost and space savings and with a high degree of freedom of dead time. However, the rectifier 1110 is not limited to the specific embodiments but may be implemented by any system, part or circuit capable of converting an AC signal to a DC signal.

Also, the transmitter-side DC/DC converting unit 1120 adjusts the level of a DC signal provided from the rectifier 1110 according to the control of the transmitter-side communication and control unit 1500. For example, the transmitter-side DC/DC converting unit 1120 may be implemented by a Buck converter that steps down the level of an input signal, a Boost converter that steps up the level of an input signal, a Buck-Boost converter that may step down or step up the level of an input signal, or a Cuk converter.

Also, the transmitter-side DC/DC converting unit 1120 may include a switching component, inductor and capacitor that perform the role of mediating power conversion or regulating an output voltage, and a transformer adjusting voltage gain or providing an electric separation (insulation) function. The transmitter-side DC/DC converting unit 1120 may be configured to perform the function of removing ripples included in an input DC signal or pulsation components (an AC component included in a DC signal). An error between a command for an output signal from the transmitter-side DC/DC converting unit 1120 and an actual output signal may be adjusted through feedback, which may be accomplished by the transmitter-side communication and control unit 1500.

The transmitter-side DC/AC converting unit 1200 may be configured to convert a DC signal output from the transmitter-side AC/DC converting unit 1100 to an AC signal and to adjust the frequency of the converted AC signal according to the control of the transmitter-side communication and control unit 1500. The transmitter-side DC/AC converting unit 1200 may be implemented by, for example, but not limited to, a half-bridge inverter or a full-bridge inverter. And, the wireless power transfer system may employ various types of amplifiers that convert a DC signal to an AC signal, which may include, for example, but not limited to, class A, B, AB, C, E, and F amplifiers. Also, the transmitter-side DC/AC converting unit 1200 may include an oscillator generating a periodic output signal at a specific frequency and a power amplifier amplifying an output signal.

The structure of the AC/DC converting unit 1100 and the transmitter-side DC/AC converting unit 1200 may be substituted by an AC power supply, which may be omitted or replaced with still another structure.

The transmitter-side impedance matching unit 1300 may minimize reflected waves at points showing different impedances to improve signal flow.

Two coils of the transmitter 1000 and the receiver 2000 are spatially separated from each other and thus may generate a large amount of leaking magnetic field. Therefore, by compensating for the impedance difference between two connection ports of the transmitter 1000 and the receiver 2000, the power transfer efficiency may be improved.

The transmitter-side impedance matching unit 1300 may be implemented by using at least one of a inductor, a capacitor, and a resistor component. The impedance value for the impedance matching may be adjusted by varying the inductance of the inductor component, the capacitance of the capacitor component, and the resistance of the resistor component according to the control of the communication and control unit 1500. And if the wireless power transfer system transmits power according to the magnetic induction scheme, the transmitter-side impedance matching unit 1300 may have a series resonant structure or a parallel resonant structure, and minimize energy loss by increasing the induction coupling coefficient between the transmitter 1000 and the receiver 2000. Meanwhile, if the wireless power transfer system 20 transmits power according to the magnetic resonance scheme, the transmitter-side impedance matching unit 1300 may allow real-time compensation for impedance matching to accommodate variation of matching impedance along an energy transfer path due to a change of separation distance between the transmitter 1000 and the receiver 2000 or due to a change of coil characteristics from introduction of metallic foreign objects (FOs) or interference by a plurality of other devices. As a compensation technique, a multi-matching technique using capacitors, a matching technique using a multi-antenna, or a technique using a multi-loop may be used.

The transmitter-side coil 1400 may be implemented by a plurality of coils or a single coil. If a plural number of transmitter-side coils 1400 is used, they may be arranged being separated from each other or arranged being overlapped with each other. When the transmitter-side coils 1400 are arranged being overlapped with each other, the overlapping area may be determined depending on variations of magnetic flux density. Also, internal and radiation resistors may be taken into account when the transmitter-side coil 1400 is manufactured. If the resistance of the transmitter-side coil 1400 is made to be small, quality factor may be improved, and transfer efficiency may be increased.

The communication and control unit 1500 may include the transmitter-side processor 1510 and the transmitter-side communication unit 1520. The transmitter-side processor 1510 may adjust an output voltage (or current (Itx_coil) flowing through the transmitter coil) of the transmitter-side AC/DC converting unit 1100 depending to at least one of an amount of required power of the receiver 2000, an amount of current charge, voltage (Vrect) of a rectifier output port of the receiver 2000, the respective charging efficiencies of a plurality of receivers, and wireless power transfer scheme. Also, the transmitter-side processor 1510 may control transmission power by generating frequency and switching waves for driving the transmitter-side DC/AC converting unit 1200 in consideration of the maximum power transfer efficiency.

Also, the transmitter-side processor 1500 may control the overall operation of the receiver 2000 by using an algorithm, a program, or an application required for the control read out from a storage unit of the receiver 2000.

Meanwhile, the transmitter-side processor 1500 may be referred to as a microprocessor, microcontroller unit, or Micom.

Figure 4A:
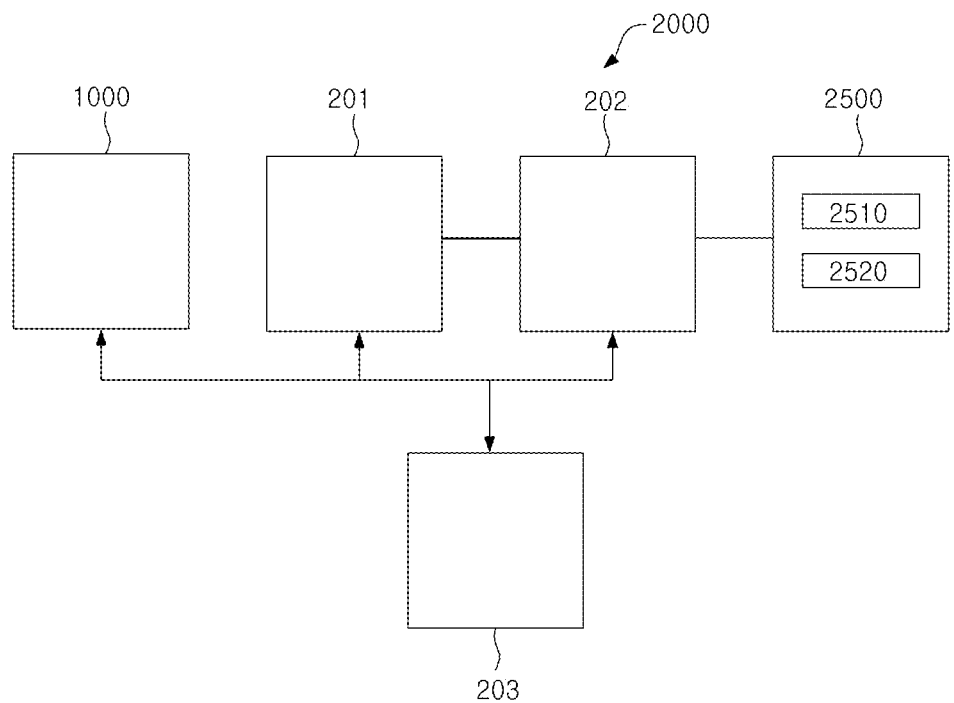
FIGS. 4a and 4b show block diagrams of a receiver, one of subsystems comprised in a wireless power transfer system, according to embodiments of the present disclosure.
Figure 4B:
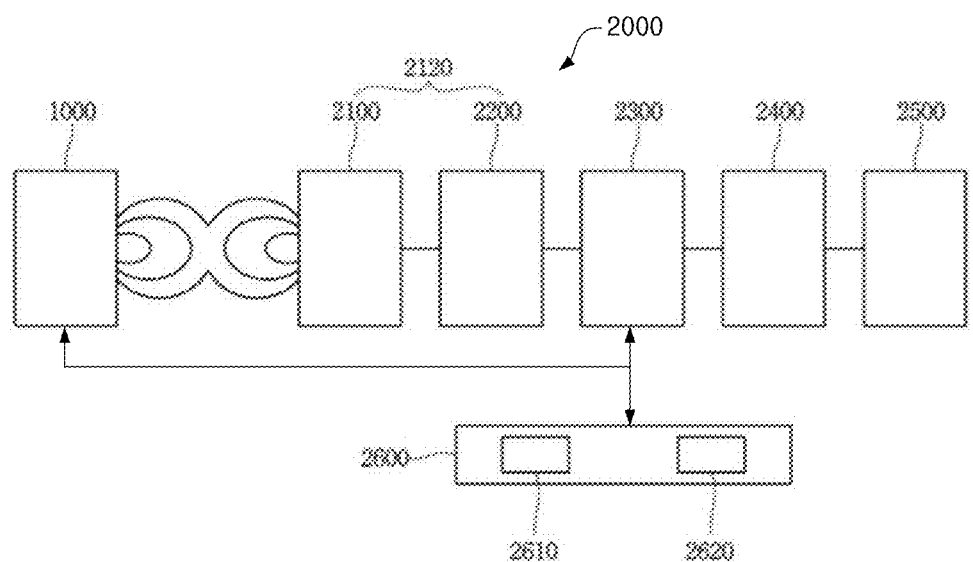
Figure 4C:
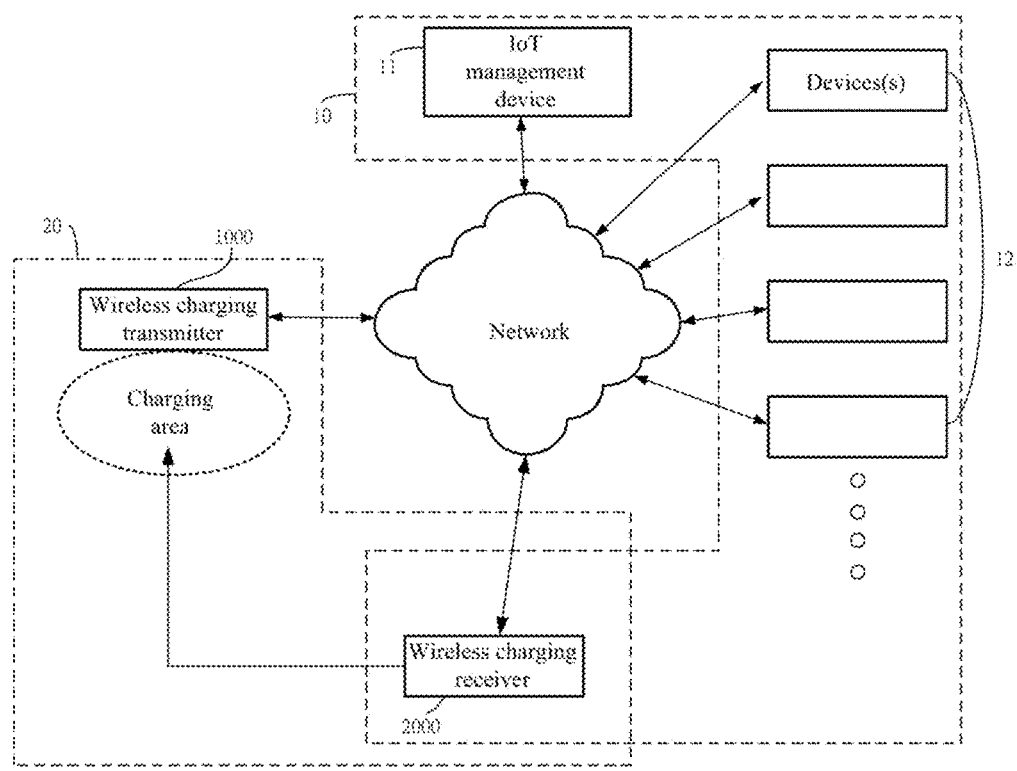
FIG. 4c illustrates an IoT system according to an embodiment of the present disclosure.

The transmitter-side communication unit 1520 may communicate with the receiver-side communication unit 2620 of FIG. 4*b* and the IoT system 10 of FIG. 4*c*. One example of a communication scheme includes a short-range communication technology such as Bluetooth, Near-Field Communication (NFC), or Zigbee.

The transmitter-side communication unit 1520 and the receiver-side communication unit 2620 may transmit and receive charging status information and charging control commands to and from each other. The charging status information may include the number of receivers 2000, an amount of remaining battery power, the number of charges, an amount of battery used, battery capacity, battery ratio, and an amount of power transmitted from the transmitter 1000.

Also, the transmitter-side communication unit 1520 may transmit a charging function control signal for controlling a charging function of the receiver 2000. The charging function control signal may be a control signal which controls the receiver 2000 to enable or disable the charging function.

Also, the transmitter-side communication unit 1520 may exchange various kinds of information with the IoT system 10.

As described above, the transmitter-side communication unit 1520 may communicate via an out-of-band scheme where the transmitter-side communication unit 1520 is employed as a separate module. However, the present disclosure is not limited to the specific embodiment. Alternatively, the transmitter-side communication unit 1520 may perform communication via an in-band scheme where the receiver 2000 uses a feedback signal provided to the transmitter 1000 by using a power signal transmitted by the transmitter 1000, and the transmitter 1000 transmits a signal to the receiver 2000 by using frequency shift of the power signal transmitted by the transmitter 1000. For example, the receiver 2000 may transmit, to the transmitter 1000, information about start of charging, end of charging, and battery status through a feedback signal by modeling the feedback signal. Also, the transmitter-side communication unit 1520 may be implemented separately from the transmitter-side processor 1510, and the receiver 2000 may also be included in the processor 2610 of the receiver or implemented separately from the processor 2610 of the receiver 2000.

Also, the transmitter 1000 of the wireless power transfer system according to an embodiment may be additionally equipped with a detection unit 1600.

The detection unit 1600 may detect at least one of an input signal of the transmitter-side AC/DEC converting unit 1100, an output signal of the transmitter-side AC/DC converting unit 1100, an input signal of the transmitter-side DC/AC converting unit 1200, an output signal of the transmitter-side DC/AC converting unit 1200, an input signal of the transmitter-side impedance matching unit 1300, an output signal of the transmitter-side impedance matching unit 1300, an input signal of the transmitter-side coil 1400, or a signal on the transmitter-side coil 1400. As one example, the detected signal may include at least one of information about current, information about voltage, or information about impedance. The detected signal may be fed back to the communication and control unit 1500, and based on the feedback signal, the communication and control unit 1500 may control the transmitter-side AC/DC converting unit 1100, the transmitter-side DC/AC converting unit 1200, and the transmitter-side impedance matching unit 1300. Also, based on the detection result of the detection unit 1600, the communication and control unit 1500 may perform Foreign Object Detection (FOD). And the detected signal may be at least one of a voltage or a current signal. Meanwhile, the detection unit 1600 may be implemented by separate hardware from the communication and control unit 1500 or integrated into one hardware.

<Receiver>

FIGS. 4a and 4b are block diagrams of a receiver, one of subsystems included in a wireless power transfer system, according to embodiments of the present disclosure.

Referring to FIG. 4a, the wireless power transfer system according to an embodiment of the present disclosure may include a transmitter 1000 and a receiver 2000 receiving power wirelessly from the transmitter 1000.

The receiver 2000 may include a receiver-side resonant circuit unit 201, a receiver-side power converting unit 202, a load 2500, and a receiver-side processor 203.

The receiver-side resonant circuit unit 201 may be configured to receive an AC signal transmitted from the transmitter 1000.

The receiver-side power converting unit 202 may be configured to convert the power of the AC signal from the receiver-side resonant circuit unit 201 and output the converted AC signal into a DC signal.

The load 2500 may be charged by receiving the DC signal outputted from the receiver-side power converting unit 202.

The receiver-side processor 203 may be configured to detect or sense current-voltage of the receiver-side resonant circuit 201, perform impedance matching of the receiver-side resonant circuit unit 201, control power conversion of the receiver-side power converting unit 202, and/or adjust the level of an output signal of the receiver-side power converting unit 202. Also, the receiver-side controller 203 may sense an input or output voltage or current of the receiver-side power converting unit 202, determine or control whether to provide an output signal of the receiver-side power converting unit 202 to the load 2500, and/or communicate with the transmitter 1000.

The receiver-side power converting unit 202 may include a power converting unit converting an AC signal to a DC signal, a power converting unit varying the level of the DC signal and outputting the level-adjusted DC signal, and a power converting unit converting the DC signal to an AC signal.

Also, referring to FIG. 4b, the wireless power transfer system according to an embodiment of the present disclosure may include a transmitter 1000 and a receiver 2000 receiving power wirelessly from the transmitter 1000. The receiver 2000 may include a receiver-side resonant circuit unit 2120 comprising a receiver-side coil unit 2100 and a receiver-side impedance matching unit 2200, a receiver-side AC/DC converting unit 2300, a DC/DC converting unit 2400, a load 2500, and a receiver-side communication and control unit 2600. The receiver-side AC/DC converting unit 2300 may include as a rectifier rectifying an AC signal to a DC signal.

The receiver-side coil unit 2100 may receive power through the magnetic induction or magnetic resonance scheme. Depending on the employed power reception scheme, the receiver-side coil unit 2100 may include at least one or more of an induction coil or a resonant coil.

For example, the receiver-side coil unit 2100 may be disposed or included in the receiver 2000 together with a Near Field Communication (NFC) antenna. And the receiver-side coil unit 2100 may be the same as the transmitter-side coil unit 1400 of FIG. 3b, and the dimensions of a receiver antenna may be varied according to electric characteristics of the receiver 2000.

The receiver-side impedance matching unit 2200 performs impedance matching between the transmitter 1000 and the receiver 2000.

The receiver-side AC/DC converting unit 2300 rectifies an AC signal outputted from the receiver-side coil unit 2100 to generate a DC signal. The output voltage of the receiver-side AC/DC converting unit 2300 may be referred to as rectified voltage (Vrect), and the receiver-side communication and control unit 2600 may detect or change the output voltage of the receiver-side AC/DC converting unit 2300 and transmit, to the transmitter 1000, status parameter information such as the minimum rectified voltage (Vrect_min) (also referred to as the minimum output voltage (Vrect_min)) which is the minimum value of the output voltage of the transmitter-side AC/DC converting unit 2300, the maximum rectified voltage (Vrect_max) (also referred to as the maximum output voltage (Vrect_max)) which is the maximum value of the output voltage, and the optimal rectified voltage (Vrect_set) (also referred to as the optimal output voltage (Vrect_set)) which takes one of voltage values ranging between the minimum and the maximum values.

The receiver-side DC/DC converting unit 2400 may adjust the level of the DC signal outputted from the receiver-side AC/DC converting unit 2300 according to the capacity of the load 2500.

The load 2500 may include, for example, but not limited to, a battery, a display, a voice output circuit, a main processor, a battery management unit, and various sensors. As shown in FIG. 4a, the load 2500 of FIG. 4b may include at least one of the battery 2510 and the battery management unit 2520. The battery management unit 2520 monitors the charging status of the battery 2510 to adjust the voltage and current supplied to the battery 2510.

The receiver-side communication and control unit 2600 may be activated by wake-up power supplied from the transmitter-side communication and control unit 1500 of FIG. 3b, perform communication with the transmitter-side communication and control unit 1500, and control the operation of one or more subsystem of the receiver 2000.

The wireless power transfer system may include a single or plurality of receivers which may receive energy wirelessly from the transmitter 1000 at the same time. In other words, in the wireless power transfer system according to the magnetic resonance scheme, one transmitter 1000 may supply power to the plurality of target receivers 2000. At this time, the transmitter-side matching unit 1300 of the transmitter 1000 may perform impedance matching between the plurality of receivers 2000 adaptively. This operation may be applied in the same way for a wireless power transfer system based on the magnetic resonance scheme where a plurality of receiver-side coil units, which are independent from each other, are used.

Also, in case that the plurality of receivers 2000 are employed, the wireless power transfer system may use the same power reception scheme or different types of power reception schemes for the respective receivers 2000. In this case, the transmitter 1000 may be a system transmitting power according to the magnetic induction scheme or magnetic resonance scheme or a system employing both schemes.

Meanwhile, the relationship between the size and frequency of a signal in a wireless power transfer system will be described. In the case of wireless power transfer based on the magnetic induction scheme, the transmitter-side AC/DC converting unit 1100 of the transmitter 1000 may receive an AC signal ranging tens to hundreds of volts (for example, 110V~220V) at tens to hundreds of Hz (for example, 60 Hz), convert the received AC signal to a DC signal of several volts to tens or hundreds of volts (for example, 10V~20V), and output the converted DC signal. The transmitter-side DC/AC converting unit 1200 may receive the DC signal and output an AC signal in the KHz range (for example, 125 KHz). And the receiver-side AC/DC converting unit 2300 of the receiver 2000 may receive the AC signal in the KHz range (for example, 125 KHz), convert the received AC signal to a DC signal of several volts to tens or hundreds of volts (for example, 10V~20V), and output the converted DC signal. The receiver-side DC/DC converting unit 2400 may produce a DC signal suitable for the load 2500, for example, a DC signal of 5 V, and provide the DC signal to the load 2500. Also, in the case of wireless power transfer based on the magnetic resonance scheme, the transmitter-side AC/DC converting unit 1100 of the transmitter 1000 may receive an AC signal ranging tens to hundreds of volts (for example, 110V~220V) at tens to hundreds of Hz (for example, 60 Hz), convert the received AC signal to a DC signal of several volts to tens or hundreds of volts (for example, 10V~20V), and output the converted DC signal. The transmitter-side DC/AC converting unit 1200 may receive the DC signal and output an AC signal in the MHz range (for example, 6.78 MHz). And the receiver-side AC/DC converting unit 2300 of the receiver 2000 may receive the AC signal in the MHz range (for example, 6.78 MHz), convert the received AC signal to a receiver-side DC signal of several volts to tens or hundreds of volts (for example, 10V~20V), and output the converted DC signal. The DC/DC converting unit 2400 may produce a DC signal suitable for the load 2500, for example, a DC signal of 5V, and provide the DC signal to the load 2500.

<IoT System and Wireless Power Transfer System>

An IoT system 10 may comprise an IoT management device 11 and a plurality of devices 12.

The IoT management device 11 may perform the function of configuring a connection between devices to allow interaction between devices linked to each other among the plurality of devices 12.

The IoT management device 11 may support a new device to join the IoT system 10. More specifically, based on unique information or identification of a new device, the IoT management device 11 may search for other devices matching the unique information. If a device that matches the unique information is detected, the IoT management device 11 may automatically perform configuration of the new device and the detected device so that data communication is allowed between the new device and the detected device.

Also, the IoT management device 11 may not only support a new device to join the IoT system 10 but also remove an existing device from the IoT system 10. Furthermore, the IoT management device 11 may process various types of error messages between devices participating in data communication with each other, monitor operating environment information of the IoT system 10 through communication with other servers, and transmit monitoring information to other servers.

Also, if receiving IoT authentication information, the IoT management device 11 may support the receiver 2000 corresponding to the IoT authentication information to join the IoT system 10. In some embodiments, although the IoT management device 11 receives the IoT authentication information, if the receiver 2000 corresponding to the IoT authentication information has already subscribed to the IoT system 10, re-subscription may not be performed.

The plurality of devices 12 may include, for example, but not limited to, a mobile computing device, device related to a user, telephone, smartphone, computerized watch (for example, smart watch), computerized eyeware, computerized hardware, other types of wearable computing devices, tablet, personal digital assistant (PDA), laptop computer, desktop computer, gaming system, media player, remote controller, e-book reader, TV platform, navigation system, digital camera, home appliance, or other arbitrary type of mobile and/or non-mobile computing device configured to perform the operations and functions described in the present disclosure. The plurality of devices 12 may be configured to communicate with other devices.

Also, the plurality of devices 12 may include a thermostat, sound system, security system, lighting system, door lock, camera, fitness tracker, scale, smart bed, irrigation system, garage door opener, home appliance, baby monitor, cleaning robot, smart doorbell, kitchen scale, fire alarm, and car key.

Additionally, the plurality of devices 12 may include temperature sensors, video cameras, audio recorders, motion sensors, humidity sensors, smoke detectors, various gas sensors, radiation monitors, security sensors such as door and/or window sensors, biometric sensors, wearable devices/sensors, implantable devices/sensors, embedded devices/sensors and/or arbitrary other devices/sensors.

The plurality of devices 12 may be or comprise smart sensors which include processing logic circuits such as one or more controllers or processors, memory, and communication interfaces but are not limited to the specific processing logic circuits. The plurality of devices 12 may include actuators, alarm devices, action devices such as automated devices or other arbitrary device capable of performing one or more actions.

Meanwhile, at least one of the plurality of devices 12 may be the wireless charging receiver 2000. Once the wireless charging receiver 2000 subscribes to, or is connected to, a wireless power network provided by the wireless power transmitter 1000, the wireless charging receiver 2000 is allowed to join the IoT system 10.

Also, the plurality of devices 12 may include at least one wireless charging transmitter 1000. By transmitting unique information of the receiver 2000 to the IoT management device 11, the wireless charging transmitter 1000 may support a new receiver to join the IoT system 10.

<Method for Establishing a Connection Between an IoT System and a Wireless Charging Receiver>

Figure 5:
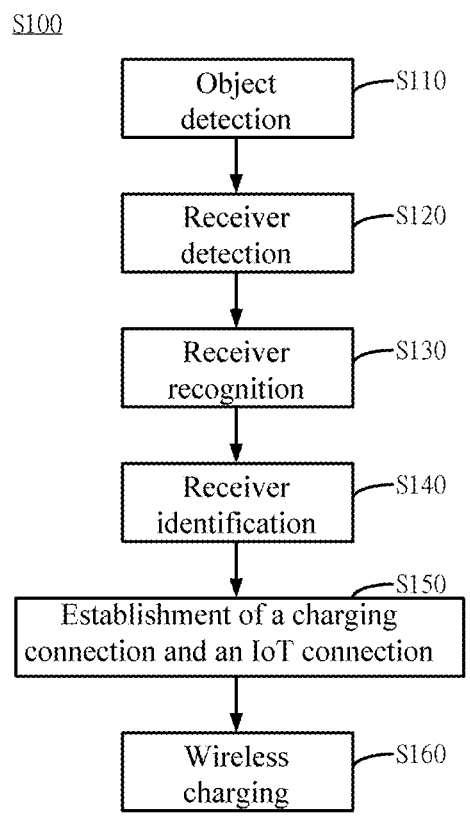
FIGS. 5 to 9 are flow diagrams illustrating various methods for establishing a connection between an IoT system and a wireless charging receiver according to embodiments of the present disclosure.

Referring to FIG. 5, a method S100 for establishing a connection between an IoT system and a wireless power receiver according to an embodiment of the present disclosure may include an object detection step S110, a receiver detection step S120, a receiver recognition step S130, a receiver identification step S140, a charging connection and an IoT connection establishment step S150, and a wireless charging step S160.

Object detection step S110: The transmitter 1000 may detect an object by determining whether the object is placed within a charging area.

Receiver detection step S120: The transmitter 1000 may output a receiver detection signal. The receiver detection signal may be a signal indicative that an object is positioned within a charging area. If an object placed within a charging area is the receiver 2000, the receiver 2000 may receive the receiver detection signal outputted from the transmitter 1000.

Receiver recognition step S130: The receiver 2000 may output a receiver confirmation signal which is a response to the receiver detection signal received from the transmitter 1000. By receiving the receiver confirmation signal from the receiver 2000, the transmitter 1000 may recognize that an object located in a charging area is the receiver 2000.

Receiver identification step S140: By receiving identification and configuration information including IoT authentication information and charging authentication information from the receiver 2000, the transmitter 1000 may identify the receiver 2000.

Charging connection and IoT connection establishment step S150: The transmitter 1000 may establish a charging connection to the receiver 2000 for wireless power transfer by making the receiver join a wireless charging network based on the received charging authentication information. And, the transmitter 1000 may transmit, to the IoT management device 11, IoT authentication information received from the receiver 1000 to support the receiver 2000 to join the IoT system 10.

Wireless charging step S160: The transmitter 1000 may charge the power of the receiver 2000 by transmitting wireless charging power to the receiver 2000.

Figure 6:
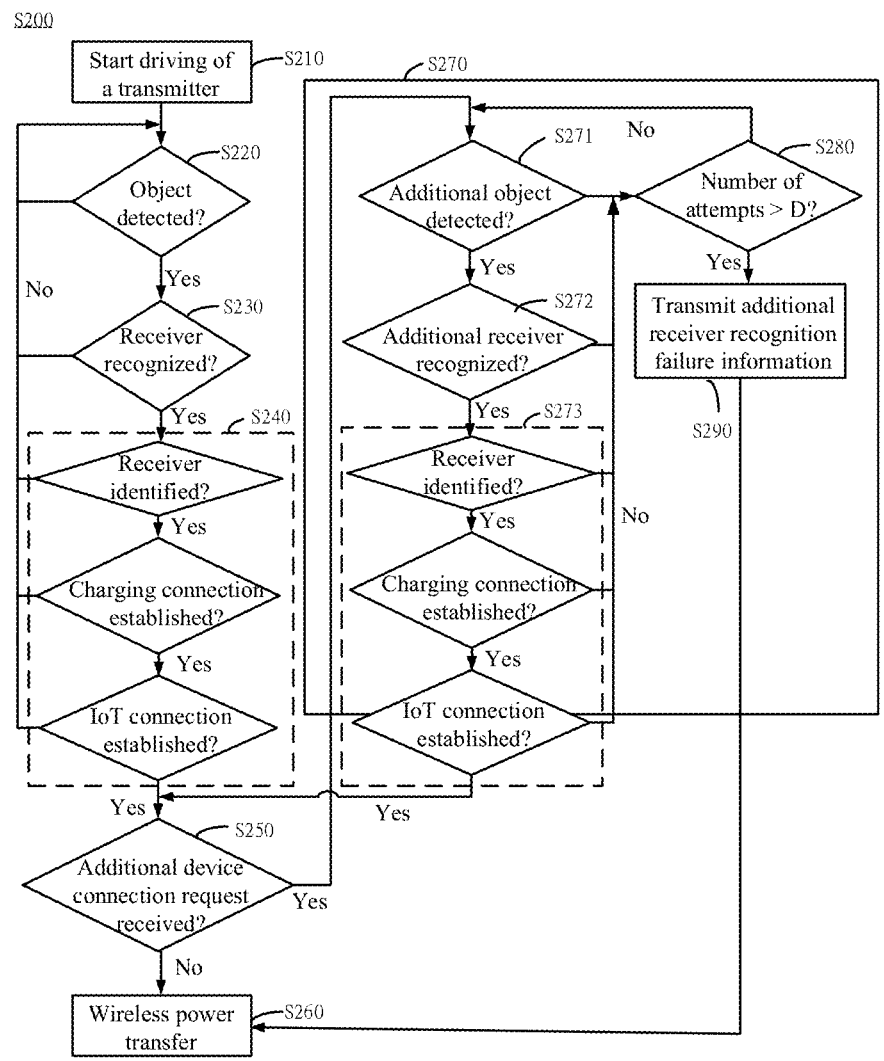

Referring to FIG. 6, in some embodiments, a method S200 for establishing a connection between an IoT system and a wireless charging receiver may include a step of initiating operation of a transmitter (S210), a step of determining detection of an object (S220), determining recognition of a receiver (S230), a step of determining identification of a receiver and establishment of a charging connection and an IoT connection (S240), a step of determining reception of an additional device connection request signal (S250), a step of transmitting wireless power to a receiver in case an additional device connection request signal is not received (S260), and a step of performing a procedure for supporting an additional device to join a wireless charging network and an IoT system in case an additional device connection request signal is received (S270).

Also, the procedure or operation S270 for supporting an additional device to join a wireless charging network and an IoT system may include a step of determining detection of an additional object (S271), a step of determining recognition of an additional receiver (S272), and a step of determining identification of an additional receiver and establishment of a charging connection and an IoT connection (S273).

Initiating operation of a transmitter (S210): If the transmitter 1000 is powered up, the operation of the transmitter 1000 may be initiated. In other words, the transmitter 1000 becomes ready to perform individual steps to be described below. Also, the transmitter 1000 may include a security authentication information input device which separate from or integrated into the transmitter 1000. The input device may be a device for fingerprint recognition, iris recognition, face recognition, and so on. The user may input security authentication information in advance through the input device.

Since the S220, S230, and S240 steps are the same as or similar to the S110 to S150 steps described above, repeated descriptions thereof will be omitted.

Determining reception of an additional device connection request signal (S250): The transmitter 1000 may determine reception of an additional device connection request signal from the IoT management device 11 before entering a power transfer step after transmitting the IoT authentication information to the IoT management device 11. In some embodiments, the reception of the additional device connection request signal from the IoT management device 11 may be determined within a predetermined time period after the IoT authentication information is transmitted to the IoT management device 11. If the IoT authentication information is received, the IoT management device 11 may identify the receiver 2000 based on the received IoT authentication information. And, the IoT management device 11 may transmit the additional device connection request signal to the transmitter 1000 if the IoT management device 11 needs authentication information for an additional device to make the receiver join the IoT system 10. In another embodiment, the IoT management device 11 may connect the receiver 2000 to devices 12 of a first group within the IoT system 10 in response to the IoT authentication information of the receiver 2000. If the receiver 2000 may be additionally connected to devices 12 of the first group and devices 12 of another second group within the IoT system 10, and the IoT authentication information for the additional device is needed for the additional connection, the IoT management device 11 may transmit an additional device connection request signal to the transmitter 1000.

Transmitting wireless power to a receiver in case an additional device connection request signal is not received (S260): If not receiving an additional device connection request signal from the IoT management device 11 for a predetermined time period, the transmitter 1000 may enter the step of transmitting wireless power.

Performing a procedure for supporting an additional device to join a wireless charging network and an IoT system in case an additional device connection request signal is received (S271): If receiving an additional device connection request signal from the IoT management device 11 within a predetermined time period, the transmitter 1000 may detect an additional device instead of entering wireless power transfer.

The transmitter 1000 may determine the detection of an additional object (S271). If the transmitter 1000 detects an object, the transmitter 1000 may output an additional receiver detection signal to the detected object. If receiving an additional receiver confirmation signal from the additional receiver, the transmitter 1000 recognizes the additional receiver (S272). If the transmitter 1000 recognizes the additional receiver, the transmitter 1000 may perform the step S273 of establishing a charging connection and an IoT connection and determine whether each individual step has been completed. And, the transmitter 1000 may determine whether an additional device connection request signal is received again from the IoT management device 11 (S250).

Meanwhile, if the transmitter 1000 fails to detect the additional object, the transmitter 1000 may determine the number of attempts for detecting the additional object or recognizing the additional receiver (S280). Also, if the transmitter 1000 fails to recognize the additional receiver, the transmitter 1000 may determine the number of attempts for detecting the additional object or recognizing the additional receiver (S280). If a total sum of the number of attempts for detecting the additional object and the number of attempts for recognizing the additional receiver is not larger than a preconfigured number D of attempts, the transmitter 1000 may retry the detection of the additional object. If the total sum is larger than D, the transmitter 1000 may transmit additional receiver recognition failure information to the IoT management device 11 (S290) and enter the wireless power transfer step S260 for wireless power transfer.

If receiving recognition failure information of the additional receiver, the IoT management device 11 may release the IoT connection of the receiver 2000 established in the S240 step. In some embodiments, the IoT management device 11 may release the IoT connection established in the S240 step, and the receiver 2000 may enter a state in which the receiver 2000 is allowed only to receive power wirelessly. In certain embodiments, the IoT management device 11 may allow the receiver 2000 to join the IoT system 10 and enable the receiver 2000 to interact with devices 12 of the first group by connecting the receiver 2000 to the devices 12 of the first group but may not connect the receiver 2000 to devices 12 of the second group.

The present embodiment assumes a situation where, when one receiver 2000 subscribes, or is connected, to the IoT system 10, a first device 12 is connected to the receiver 2000, and when a plurality of receivers 2000 including the receiver subscribe, or are connected, to the IoT system 10, a second device 12 is connected to the plurality of receivers 2000. The first and the second devices may be configured differently. In some embodiments, the second device 12 may include the first device 12 and may further include another device 12. In certain embodiments, when the receiver 2000 is connected to another device 12 requiring security (or providing another additional function), the system 10, 20 may be configured to request IoT authentication information of the additional receiver.

Figure 7:
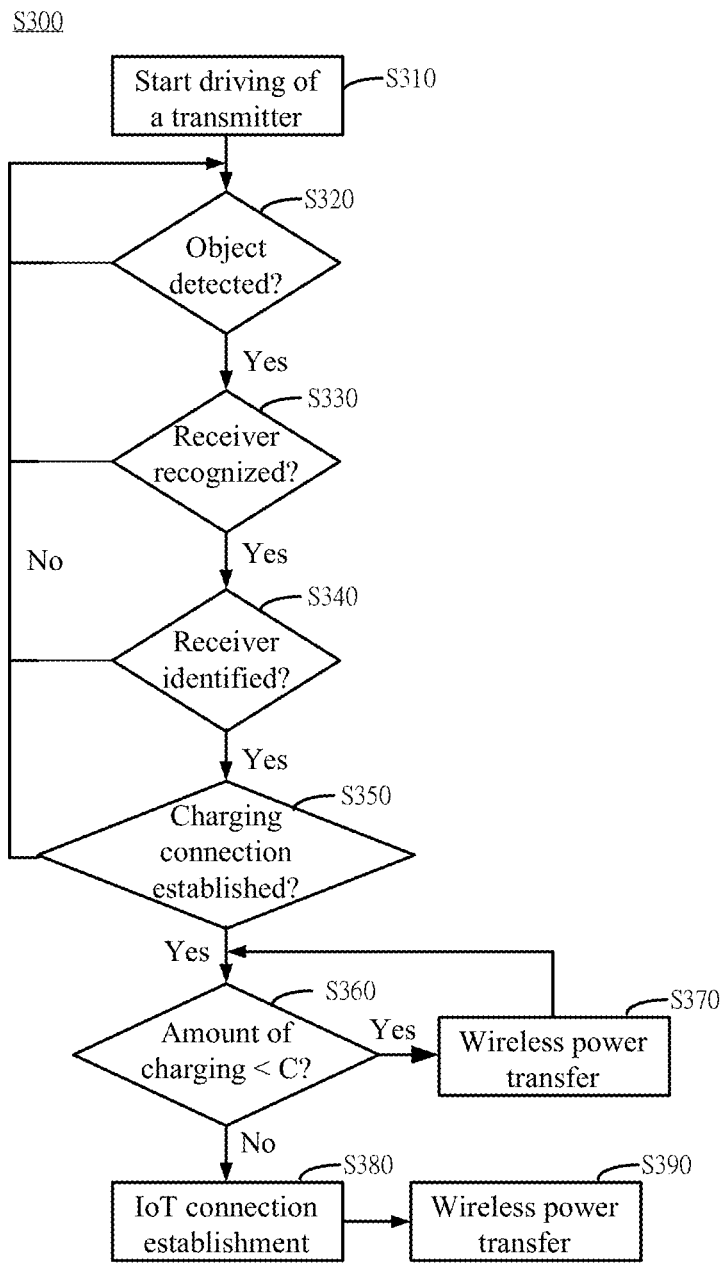

Referring to FIG. 7, a method S300 for establishing a connection between an IoT system and a wireless charging receiver may include initiating operation of a transmitter (S310), determining detection of an object (S320), determining recognition of a receiver (S330), determining identification of the receiver (S340), determining whether to establish a charging connection (S350), determining whether an amount of charging of the receiver is less than a preconfigured amount C for charging (S360), transmitting wireless power if an amount of charging of the receiver is less than the preconfigured amount C for charging (S370), establishing an IoT connection if an amount of charging of the receiver is not less than the preconfigured amount C for charging (S380), and transmitting wireless power after establishment of an IoT connection (S390).

According to the present embodiment, if the receiver 2000 is in a discharged state and is unable to interact with at least one other device 12 after subscription or connection to the IoT system 10, the receiver 2000 may be made to subscribe, or be connected, to the IoT system 10 after charging for a predetermined time period. Also, if the current amount of charging of the receiver 2000 is low and thus interaction with at least one other device 12 is not sufficient enough after subscription or connection to the IoT system 10, the receiver 2000 may be made to subscribe, or be connected to the IoT system 10 after being charged for a predetermined time period. According to the present embodiment, after the receiver 2000 has subscribed, or been connected, to the IoT system 10, considerable power consumption may occur when the receiver 2000 performs data transmission and reception to and/or from at least one device 12 and/or a specific operation under the control of at least one device 12. At this time, the receiver 2000 may correspond to a state where the receiver 2000 is not suitable for performing the operation above with the current amount of charging, thereby preventing a problem that the receiver 2000 is not allowed to exercise its full capabilities as a device within the IoT system 10.

Now, each individual step will be described in more detail. Since S310, S320, S330, and S340 steps are the same as S110 to S140 steps of FIG. 5 described above, repeated descriptions thereof will be omitted.

The transmitter 1000 makes the receiver 2000 subscribe, or be connected, to a wireless network based on charging authentication information. If the receiver 2000 fails to join the wireless network, the transmitter 1000 transitions again to the object detection step. However, if the receiver 2000 succeeds in joining the wireless network, the transmitter 1000 may determine whether the current amount of charging of the receiver 2000 is less than a preconfigured amount C for charging. If the current amount of charging is less than the preconfigured amount C, the transmitter 1000 may proceed to the wireless power transfer step S370 to transfer wireless charging power to the receiver 2000 and proceed again to the S360 step after a predetermined time period.

If the current amount of charging of the receiver 2000 is larger than the preconfigured amount C for charging, the transmitter 1000 transmits IoT authentication information to the IoT management device 11 to support the receiver 2000 to subscribe, or be connected, to the IoT system 10. Afterwards, the transmitter 1000 may proceed to the wireless power transfer step and transfer wireless charging power to the receiver 2000 (S390).

Figure 8:
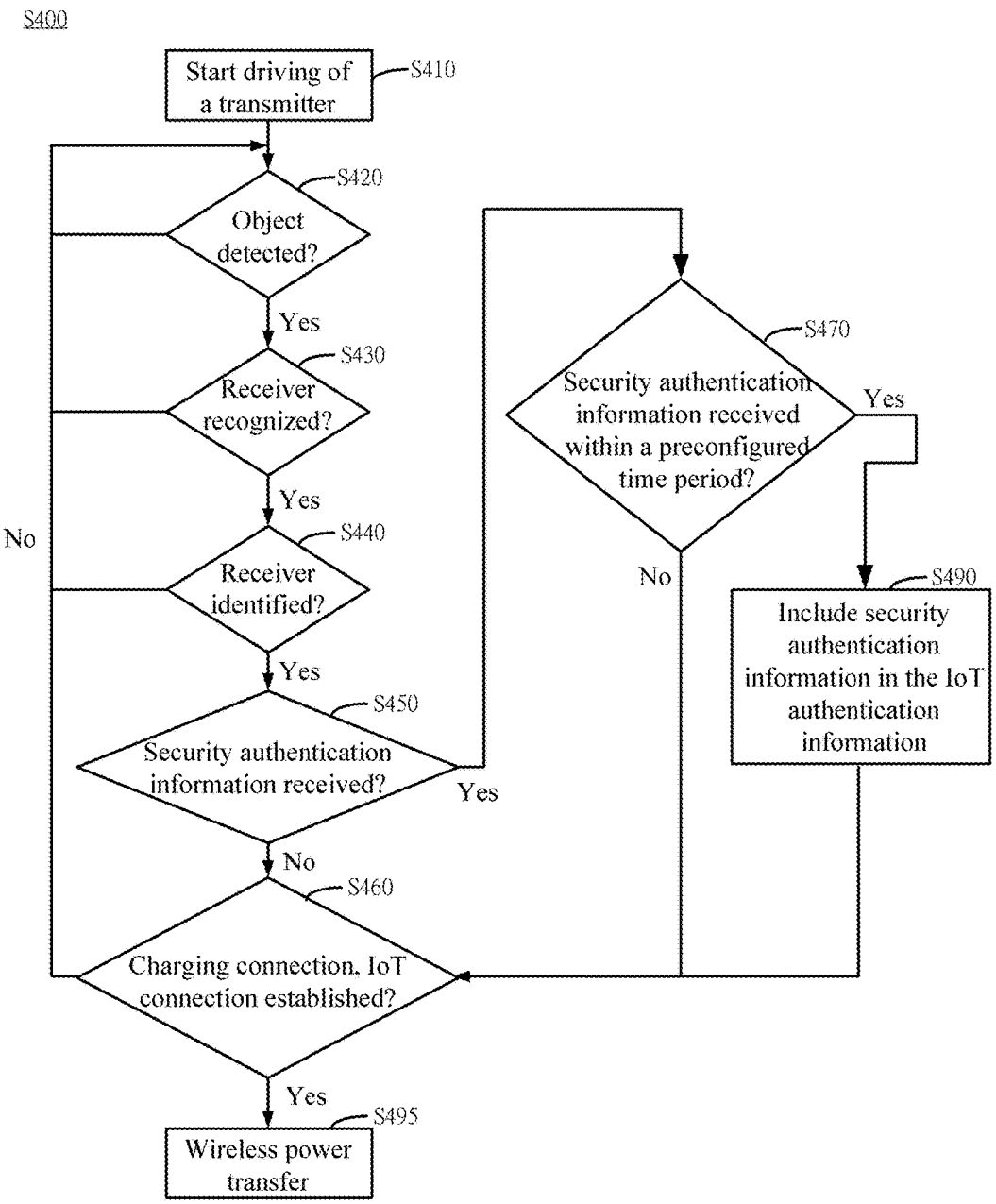

Referring to FIG. 8, a method S400 for establishing a connection between an IoT system and a wireless charging receiver may include initiating operation of a transmitter (S410), determining detection of an object (S420), determining recognition of a receiver (S430), determining identification of the receiver (S440), determining reception of security authentication information (S450), establishing a charging connection and an IoT connection if security authentication information is not received (S460), determining reception of security authentication information within a preconfigured time period upon reception of security authentication information (S470), and including or adding security authentication information in or to IoT authentication information if it is determined that the security authentication information has been received within a preconfigured time period (S490).

A user may input security authentication information through an input device included in or associated with the transmitter 1000 or through the input device included in or associated with the receiver 2000. When the security authentication information is received, if the receiver 2000 subscribes, or is connected, to the IoT system 10, the receiver 2000 is allowed to interact with a specific device 12 within the IoT system 10. In another aspect, the receiver 2000 is allowed to subscribe, or be connected, to the IoT system 10 only if the security authentication information has been received. In yet another aspect, if the security authentication information is received, at least part of functions according to interaction with other devices 12 connected to each other may be activated additionally.

Now, each individual step will be described in more detail. Since S410, S420, S430, and S440 steps are the same as S110 to S140 steps of FIG. 5 described above, repeated descriptions thereof will be omitted.

The transmitter 1000 may determine reception of security authentication information (S450). A method according to which the security authentication information is input to the transmitter 1000 is as follows. The method may be based on an assumption that the user inputs the security authentication information to the transmitter 1000 after the transmitter 1000 is driven to operation, and then the receiver 2000 is placed within a charging area of the transmitter 1000. In some embodiments, the method may be based on an assumption that the user inputs the security authentication information to the transmitter 1000 or the receiver 2000 after placing the receiver 2000 in the charging area of the transmitter 1000, If the reception of the security authentication information is not confirmed, the transmitter 1000 may establish a charging connection and an IoT connection (S460) and then transition to the state for wireless power transfer (S495).

However, if the reception of the security authentication information is confirmed, the transmitter 1000 may determine whether the confirmed security authentication information has been received within a preconfigured time period (S470). As an example, the reception of the security authentication information may be confirmed within a time period ranging from the moment the transmitter 1000 recognizes the receiver 2000 back to a predetermined past time point or within a predetermined time period since from the moment the receiver 2000 is recognized.

If the reception of the security authentication information is not confirmed within a preconfigured time period, the transmitter 1000 may proceed to the S460 step. However, if the reception of the security authentication information is confirmed with a preconfigured time period, the transmitter 1000 may include or add the confirmed security authentication information in or to the received IoT authentication information (S490). And then the transmitter 1000 may proceed to the S460 step.

In the S460 step, the transmitter 1000 may perform establishment of an IoT connection by transmitting IoT authentication information including the security authentication information to the IoT management device 11.

Figure 9:
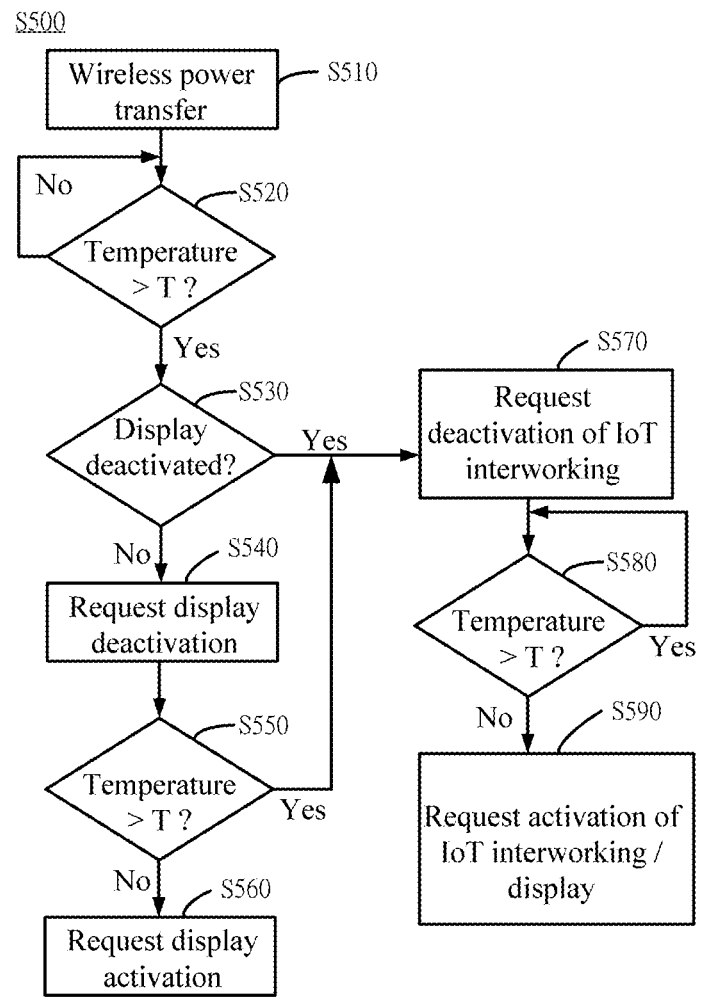

Referring to FIG. 9, a method S500 for establishing a connection between an IoT system and a wireless charging receiver may include transmitting by a transmitter wireless power to a receiver (S510), monitoring a first stage temperature of the receiver (S520), determining deactivation of a display (S530), deactivating the display (S540), monitoring a second stage temperature of the receiver (S550), transmitting a display activation request to the receiver (S560), requesting deactivation of IoT interworking (S570), monitoring a third stage temperature of the receiver (S580), and requesting IoT interworking and display activation (S590).

The present embodiment of the present disclosure may manage heat generated from charging during wireless charging and heat generated due to operation of the receiver 2000 on the IoT system. In other words, the transmitter 1000 may receive temperature information from the receiver 2000 for management of wireless charging power, and manage the heat generated from the receiver 2000 by controlling the receiver 2000 and IoT interworking based on the temperature information. Also, a display device may be turned on when the receiver 2000 interacts with at least one device 12 according to the IoT interworking. By taking into account the fact that the display device may be the primary cause of temperature increase, the embodiment may manage whether to drive the display of the receiver 2000. The display device or the display may be included in the receiver 2000 or connected to the receiver 2000.

More specifically, the transmitter 1000 may receive the temperature information from the receiver 2000 while transmitting power to the receiver 2000 at step S510. The transmitter 1000 may determine whether the temperature of the receiver 2000 exceeds a preconfigured temperature value T (S520). Here, T may assume a threshold temperature value lower than the temperature of the receiver 2000 which causes transfer of wireless power to be stopped. If the temperature of the receiver 2000 exceeds the preconfigured value T, the transmitter 1000 may determine whether the display of the receiver 2000 has been activated (S530).

If the display of the receiver 2000 is in the active state, the transmitter 1000 may transmit a display deactivation request signal to the receiver 2000 (S540). The receiver 2000 may turn off the display in response to the deactivation request signal. And the deactivation state of the display device of the receiver 2000 may be maintained even while the receiver 2000 interacts with at least one device 12 according to the IoT interworking.

The transmitter 1000 may again determine whether the temperature of the receiver 2000 exceeds the preconfigured value T (S550). If the temperature of the receiver 2000 is lower than the preconfigured value T, the transmitter 1000 may transmit a display activation request signal to the receiver 2000 (S560). In response to the display activation request signal, the receiver 2000 allows the display to be turned on when the receiver 2000 interacts with at least one device 12 during IoT interworking.

As described above, in case the display of the receiver 2000 is deactivated or the temperature of the receiver 2000 exceeds the preconfigured value T at the time of second stage temperature monitoring, the transmitter 1000 may transmit an IoT interworking deactivation request signal to the IoT management device 11 (S570). In response to the IoT interworking deactivation request signal, the IoT management device 11 may force or control the receiver 2000 to stop interacting with other devices 12.

The transmitter 1000 may again determine whether the temperature of the receiver 2000 exceeds the preconfigured value T (S580).

If the temperature of the receiver 2000 does not exceed the preconfigured value T, the transmitter 1000 may transmit an IoT interworking request signal to the IoT management device 11 (S590). In some embodiments, the transmitter 1000 may transmit the IoT interworking request signal to the IoT management device 11 and transmit a display activation request signal to the receiver 2000.

Meanwhile, if the receiver 2000 is in an overheated state not suitable for wireless power charging, the transmitter 1000 may immediately stop wireless power charging, and at this time, the temperature of the receiver 2000 may be set higher than the aforementioned temperature T.

According to yet another embodiment, the transmitter 1000 may transmit unique information of the transmitter 1000 at the time of transmitting IoT authentication information or in response to the request of the IoT management device 11 or at a different time point. The IoT management device 11 may determine location information of the transmitter 1000 based on the unique information of the transmitter 1000. And the IoT management device 11 may connect the receiver 2000 to at least one device 12 within the IoT system 10 determined according to the location of the transmitter 1000. Therefore, if the user places the receiver 2000 close to one of a plurality of transmitter devices disposed at different positions from each other, the receiver 2000 is allowed to interact with devices 12 predetermined according to the position of the corresponding transmitter. In other words, the receiver 2000 may be allowed to interact with other devices 12 suitable for the user position/receiver position.

<Operation Phase of Transmitter>

First Embodiment of the Transmitter Operation

Figure 10:
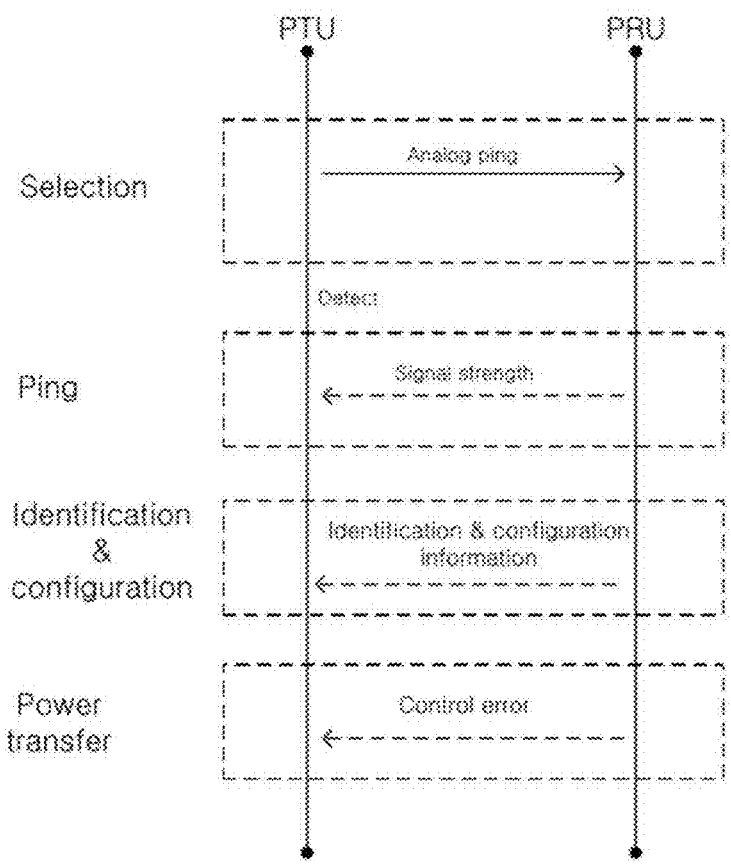
FIGS. 10 to 12 are flow diagrams illustrating methods for establishing a connection between an IoT system and a wireless charging receiver based on operation phases of a transmitter according to embodiments of the present disclosure.

FIG. 10 is a flow diagram illustrating a method for establishing a connection between an IoT system and a wireless charging receiver. FIG. 10 is an action diagram based on operation phases of a transmitter according to a first embodiment of the present disclosure.

Referring to FIGS. 5 and 10, according to the first embodiment of the present disclosure, a transmitter 1000 may have one or more of 1) selection phase for object detection, 2) ping phase for recognition and identification of a receiver, 3) identification and configuration phase, 4) power transfer phase, and 5) end of charge phase.

[Selection Phase: Object Detection Step S110]

(1) In the selection phase of FIG. 10, the transmitter 1000 may perform a detection process for selecting the receiver 2000 located in a detection area or a charging area.

(2) As described above, the detection area or charging area may refer to an area in which an object located within the corresponding area may exert influence on the characteristics of power of the transmitter-side power converting unit 101. Compared with the detection phase to be described later, the detection process for selecting the receiver 2000 in the selection phase is a process of confirming whether an object exists within a predetermined range by detecting a change of an amount of power in the power converting unit 101 of the transmitter 1000 for generating a wireless power signal rather than receiving a response from the receiver 2000 by using a power control message. The detection process in the selection phase may be referred to as an analog ping process in a sense that the detection process does not use digital packets employed in the detection phase described later but detects an object by using a wireless power signal.

(3) In the selection phase, the transmitter 1000 may detect coming and going of an object within a detection area or a charging area. Also, the transmitter 1000 may distinguish the receiver 2000 to which power may be transferred wirelessly from other non-transferable objects (for example, key or coin) among objects located within the detection area or charging area.

As described above, since distances to which power is transmitted wirelessly are different according to an inductive coupling method or a resonance coupling method, the detection area in which object detection may be actually performed in the selection phase may vary depending on an employed method.

(4) First, in case power is transmitted according to the inductive coupling method, the transmitter 1000 in the selection phase may monitor an interface surface to detect disposition and removal of objects.

Also, the transmitter 1000 may detect the position of the wireless charging receiver 2000 placed on the upper part of the interface surface.

(5) If the transmitter 1000 includes one or more transmission coils, the transmitter 1000 may perform a method by which the transmitter 1000 enters the detection phase from the selection phase, checks in the detection phase whether a response to a detection signal is transmitted from an object by using each coil or enters the identification phase afterwards and checks whether identification information is transmitted from an object.

The transmitter 1000 may obtain the position of the receiver 2000 detected through the process described above and determine the coil to be used for wireless power transfer among the plurality of transmission coils based on the obtained position information.

(6) Also, in case power is transmitted according to the resonance coupling method, the transmitter 1000 in the selection phase may detect an object by sensing change in one or more of frequency, current, and voltage of the power converting unit 101 due to an object within the detection area or charging area.

(7) Meanwhile, the transmitter 1000 in the selection phase may detect an object by using at least one of detection methods employing inductive coupling and resonance coupling methods.

(8) The transmitter 1000 may perform an object detection process according to each power transfer method and to subsequently proceed to other phases, select a method used for detecting an object among coupling methods for wireless power transfer.

(9) Meanwhile, a wireless power signal generated to detect an object by the transmitter 1000 in the selection phase and a wireless power signal generated for digital detection, identification, configuration, and power transfer in subsequent phases may show different characteristics such as frequency and signal strength. This is intended to make the transmitter 1000 reduce power consumption in the idle phase or generate a specific signal for efficient object detection because the selection phase of the transmitter 1000 corresponds to an idle phase for detecting an object.

[Ping Phase: Receiver Detection and Recognition Step S120, S130]

(1) In the ping phase, the transmitter 1000 may perform a process of detecting the receiver 2000 located within a detection area or charging area through a power control message. Compared with the process for detecting the receiver 2000 by using characteristics of a wireless power signal in the selection phase, the detection process in the ping phase may be referred to as a digital ping process.

(2) The transmitter 1000 may output a detection signal of the receiver by generating and outputting a wireless power signal for detecting the receiver 2000 (S120). If an object is the receiver 2000 capable of receiving wireless charging power, the receiver 2000 may receive the detection signal of the receiver transmitted by the transmitter 1000. And, the receiver 2000 may modulate the detection signal of the receiver 2000 and output the modulated detection signal. The transmitter 1000 may demodulate the wireless power signal modulated by the receiver 2000 and obtain, from the demodulated wireless power signal, a power control message in a digital data form corresponding to a response to the detection signal of the receiver 2000.

(3) By receiving the power control message corresponding to a response to the detection signal of the receiver 2000, the transmitter 1000 may recognize the receiver 2000 which is a target of power transfer.

(4) The detection signal generated by the transmitter 1000 in the ping phase for performing a digital detection process may be a wireless power signal generated by applying a power signal at a specific operating point for a predetermined time period.

At this time, the operating point may indicate the frequency, duty cycle, and amplitude of a voltage applied to the transmitter coil unit 1400.

The transmitter 1000 may generate a detection signal for a predetermined time period by applying a power signal of the specific operating point and attempt to receive a power control message from the receiver 2000.

(5) Meanwhile, the power control message corresponding to a response to the detection signal may be a message representing strength of a wireless power signal received by the receiver 2000. For example, the receiver 2000 may transmit a signal strength packet which includes a message or data representing strength of a wireless power signal received as a response to the detection signal. The signal strength packet may comprise a header informing that the packet indicates signal strength and a message or data representing strength of a power signal received by the receiver 2000. The strength of the power signal in the message may represent the degree of inductive coupling or resonance coupling for power transfer between the transmitter 1000 and the receiver 2000.

(6) After discovering the receiver 2000 by receiving a message responded to the detection signal, the transmitter 1000 may extend the digital detection process and enter the identification and detection phase. In other words, after discovering the receiver 2000, the transmitter 1000 may maintain a power signal of a specific operating point to receive a power control message needed in the identification and detection phase.

However, if the transmitter 1000 fails to discover the receiver 2000 to which power may be transferred, the operating phase of the transmitter 1000 may return to the selection phase.

[Identification and Configuration Phases: Receiver Identification Step S140, Charging Connection and IoT Connection Establishment Step S150]

(1) In the identification and configuration phases, the transmitter 1000 may receive identification information and/or configuration information transmitted by the receiver 2000, identify the receiver 2000, control the transmitter-side communication and control unit 1500 so that power transfer may be performed efficiently, and establish a connection between the receiver 2000 and the IoT system 10.

(2) In the identification and configuration phases, the receiver 2000 may transmit a power control message including its own identification information. For example, the receiver 2000 may transmit an identification packet including a message or data indicating identification information of the receiver 2000. The identification packet may comprise a header informing that the packet represents the identification information and a message or data including identification information of the receiver 2000. The message or data may include information about the version of a specification for wireless power transfer, information for identifying a manufacturer of the receiver 2000, information indicating existence of an extended device identifier, and a default device identifier. Also, if the information indicating existence of an extended device identifier indicates the presence of the extended device identifier, an extended identification packet including the extended device identifier may be transmitted separately. The packet may include a header informing that the packet represents the extended device identifier and a message or data including the extended device identifier. If the extended device identifier is used as described above, identification information of a manufacturer for identifying the receiver 2000, the default device identifier, and information based on the extended device identifier may be used. And, the identifier may be used for distinguishing the receiver 2000 from other devices 12. Also, at least one of the identifiers may be used as IoT authentication information and/or charging authentication information. In some embodiments, at least one of the identifiers may constitute as a part of the charging authentication information. In other embodiments, at least one of the identifiers may be used as the security authentication information input through the receiver 2000.

In the identification and configuration phases, the receiver 2000 may transmit a power control message or data including information about expected maximum power. For example, the receiver 2000 may transmit a configuration packet. The configuration packet may be configured to include a header informing that the packet is a configuration packet and a message or data including information about the expected maximum power. The message or data may be include a power class, information about the expected maximum power an indicator indicating a method for determining current of a primary cell of the transmitter 1000, the number of selective configuration packets, and current charging status information. The indicator may indicate whether the current of the primary cell of the transmitter 1000 is determined as specified in a contract for wireless power transfer. Also, the information included in the power control message may become the charging authentication information or part of the information constituting the charging authentication information. In some embodiments, at least part of the information of the power control message described separately in (2) and (3) may constitute the charging authentication information.

(4) Meanwhile, the transmitter 1000 may generate a power transfer contract used for the receiver 2000 and power charging based on the identification information and/or configuration information. The power transfer contract may include limits of parameters that may determine power transfer characteristics in the power transfer phase.

(5) The transmitter 1000 may complete the charging connection establishment step by establishing a connection to the receiver 2000 for transferring wireless charging power to the receiver 2000 based on the charging authentication information.

(6) The transmitter 1000 may utilize at least part of information included in the power control message or data received from the receiver 2000 for wireless charging power transfer as the IoT authentication information. The transmitter 1000 may extract at least part of information in the power control message or data and transmit the extracted information to the IoT system 10. In other words, the transmitter 1000 may transmit the IoT authentication information to the IoT system 10. If receiving the IoT authentication information, the IoT system 10 makes the receiver 2000 join the IoT system 10 so that the receiver 2000 may be connected to other devices 12 in the IoT system 10. Here, the connection should be construed in such a way that devices are connected to each other so as to be enabled for data communication and control between at least one device 12 and the receiver 2000.

(7) The transmitter 1000 may terminate the identification and configuration phases before entering the power transfer phase and return to the selection phase. For example, the transmitter 1000 may terminate the identification and configuration phases to find another receiver capable of receiving power wirelessly.

[Power Transfer Phase: Wireless Charging Step S160]

(1) In the power transfer phase, the transmitter 1000 transmits power to the receiver 2000.

(2) The transmitter 1000 may receive a power control message or signal from the receiver 2000 in the middle of transmitting the power and adjust the characteristics of the power applied to the transmitter coil unit 1400 in response to the received power control message or signal. For example, the power control message or signal used for adjusting the power characteristics of the transmitter coil may be included in a control error packet. The control error packet may be configured to include a header informing that the packet is a control error packet and a message including a control error value. The transmitter 1000 may adjust the power applied to the transmitter coil according to the control error value. In other words, the current applied to the transmitter coil is adjusted so that it can be maintained when the control error value is 0, decreased in the case of a negative value, and increased in the case of a positive value.

(3) In the power transfer phase, the transmitter 1000 may monitor parameters compliant with the power transfer contract generated based on the identification information and/or configuration information. If the transmitter 1000 finds from the monitoring of parameters that the power transfer to the receiver 2000 is out of the limits included in the power transfer contract, the transmitter 1000 may cancel or stop the power transfer and return to the selection phase.

(4) The transmitter 1000 may terminate the power transfer state based on the power control message or signal transmitted from the receiver 2000.

For example, if battery charging is completed while the receiver 2000 charges the battery by using the transmitted power, the receiver 2000 may transmit, to the transmitter 1000, a power control message or signal requesting the transmitter 1000 to stop wireless power transfer. In this case, after receiving a message or signal requesting power transfer to be stopped, the transmitter 1000 may terminate wireless power transfer and return to the selection phase.

In another example, the receiver 2000 may transmit a power control message or signal requesting renegotiation or reconfiguration to update an already generated power transfer contract. In case a larger or smaller amount of power than the amount of currently transferred power is required, the receiver 2000 may transmit a message or signal requesting renegotiation of the power transfer contact. In this case, after receiving the message requesting renegotiation or reconfiguration of the power transfer contract, the transmitter 1000 may terminate wireless power transfer and return to the identification and configuration state.

To this end, the message or signal transmitted by the receiver 2000 may include, for example, an end power transfer packet. The end power transfer packet may be configured to include a header informing that the packet is an end power transfer packet and a message containing an end power transfer code indicating a cause of ending power transfer. The end power transfer code may indicate any one of charge complete, internal fault, over-temperature, overvoltage, overcurrent, battery failure, reconfigure, no response, or unknown.

In yet another example, if detecting ongoing full charging of the load 2500, the transmitter 1000 may stop power transfer regardless of the reception of a message or signal from the receiver 2000.

(5) In another aspect, if the receiver 2000 is removed from the charging area and placed again in the charging area, the cycle described above may be restarted. In this case, the transmitter 1000 may transmit its own status information to the IoT system 10.

(5-1) Also, depending on the charging state of the load 2500 of the receiver 2000, the transmitter 1000 may return to the authentication status to provide, to the receiver 2000, charging power adjusted based on the state information of the load 2500. And, the transmitter 1000 may retransmit, to the IoT system 10, authentication information received from the receiver 2000 according to re-authentication. In yet another aspect, if it is determined that the re-authentication phase has occurred within a preconfigured time period, the transmitter 1000 may not transmit the authentication information received during the re-authentication process to the IoT system 10.

Second Embodiment of the Transmitter Operation

Figure 11:
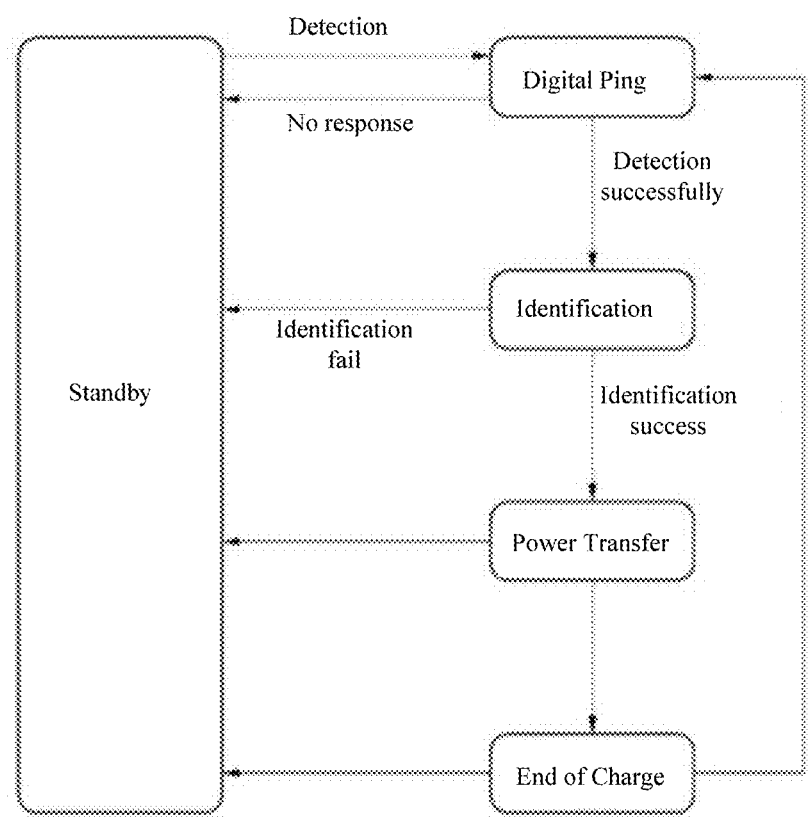

FIG. 11 is a flow diagram illustrating a method for establishing a connection between an IoT system and a wireless charging receiver. FIG. 11 is an action diagram based on operation phases of a transmitter according to a second embodiment of the present disclosure.

Referring to FIG. 11, according to the second embodiment of the present disclosure, a transmitter may have at least 1) standby phase for object detection, 2) digital ping phase for recognition and identification of a receiver, 3) identification phase, 4) power transfer phase, and 5) end of charge phase.

[Standby Phase: Object Detection Step S110]

(1) When power is applied from the outside to the transmitter 1000 or inputted to the transmitter 1000 and the transmitter 1000 is started up, the transmitter 1000 may enter the standby phase. The transmitter 1000 in the standby phase may detect the existence of an object (for example, the receiver 2000 or a metallic foreign object (FO)) located within a detection area or a charging area. Also, the transmitter 1000 may detect whether the object has been removed from the charging area or detection area.

(2) The transmitter 1000 may detect the existence of the object in the charging area or detection area by monitoring, for example, but not limited to, change in or variation of a magnetic flux, change in variation of capacitance or inductance between the object and the transmitter 1000, or shift of a resonant frequency.

(3) If the transmitter 1000 detects an object, which is the receiver 2000 within the charging area, the transmitter 1000 may move to the next step, a digital ping phase.

(4) Also, if the FO such as a metallic foreign object is disposed in the charging area, the transmitter 1000 may detect the FO.

(5) Meanwhile, if the transmitter 1000 does not obtain enough information to distinguish the receiver 2000 and the FO from each other, the transmitter 1000 may proceed to the digital ping phase or identification phase to check whether the object is the receiver 2000 or the FO.

[Digital Ping Phase: Receiver Detection and Recognition Step S120, S130]

(1) In the digital ping phase, the transmitter 1000 is connected to a rechargeable receiver 2000 and checks whether it is a valid receiver 2000 that may be charged by wireless power provided from the transmitter 1000. To be connected to the rechargeable receiver 2000, the transmitter 1000 may generate and output a digital ping signal having a preconfigured frequency and timing.

(2) If the transmitter 1000 transmits a power signal sufficient for digital ping to the receiver 2000, the receiver 2000 may respond to the digital ping by modulating the power signal according to a communication protocol. And, if the transmitter 1000 receives a valid signal from the receiver 2000, the transmitter 1000 may move to the identification phase while removing the power signal. If the transmitter receives an end of charge (EOC) request from the receiver 2000 or detects ongoing full charging of the load 2500, the transmitter 1000 may move to the end of charge phase.

(3) Also, in case the valid receiver 2000 is not detected or a response time of an object to the digital ping exceeds a preconfigured time period, the transmitter 1000 may remove the power signal and return to the standby phase. Therefore, if the FO is disposed within the charging area, since the FO is not able to make any response, the transmitter 1000 may return to the standby phase.

(4) In the digital ping phase, the transmitter 1000 may receive, from the receiver 2000, information about an amount of current charge of the receiver 2000.

[Identification Phase: Receiver Identification Step S140, Charging Connection and IoT Connection Establishment Step S150]

(1) If the receiver 2000 completes a response action to the digital ping of the transmitter 1000, the transmitter 1000 may transmit transmitter identification information to the receiver 2000 to check compatibility between the transmitter 1000 and the receiver 2000. If the compatibility is confirmed, the receiver 2000 may transmit identification information to the transmitter 1000. And, the transmitter 1000 may confirm the receiver identification information of the receiver 2000.

(2) The identification information may be used for checking if the receiver 2000 is a device that may be charged wirelessly by the transmitter 1000. The identification information may include unique information which distinguishes the receiver 2000 from other devices 12, a manufacturer code of the receiver 2000, and other unique information specific to the receiver 2000. The identification information may be used not only for determining wireless chargeability but also as IoT identification information. In other words, the identification information may be used for the IoT system 10 to distinguish the receiver 2000 from other devices 12. In some embodiments, the identification information may include the security authentication information input to the receiver 2000.

(3) If the mutual identification is completed, the transmitter 1000 moves to the power transfer phase. However, if the mutual identification fails or a preconfigured identification time period is exceeded, the transmitter 1000 may return to the standby phase.

(4) Also, the transmitter 1000 may transmit the received identification information to the IoT system 10. The IoT system 10 receiving the identification information may make the receiver 2000 subscribe, or be connected, to the IoT system 10.

(5) Meanwhile, in the identification phase, the transmitter 1000 may receive, from the receiver 2000, information about an amount of current charge of the receiver 2000.

[Power Transfer Phase: Wireless Charging Step S160]

(1) The communication and control unit 1500 of the transmitter 1000 may provide charging power to the receiver 2000 by controlling the transmitter 1000 based on a control signal or control data received from the receiver 2000.

(2) Furthermore, the transmitter 1000 may verify whether it deviates from a proper or preset operation range or whether stability is impaired due to the FOD.

(3) Also, if the transmitter 1000 receives a charge end request signal from the receiver 2000 or detects ongoing full charging of the load 2500, the transmitter 1000 may stop power transfer and move to the end of charge phase. In some embodiments, if the receiver 2000 exceeds a preconfigured threshold temperature, the transmitter 1000 may stop the power transfer and move to the end of charge phase. In certain embodiments, if the receiver 2000 exceeds a preconfigured threshold temperature, the transmitter 1000 may control one or more display functions or the display of the receiver 2000. Alternatively, the transmitter 1000 may control IoT interworking of the receiver 2000. For example, the transmitter 1000 may control various operations of the receiver 2000 associated with the connection between the receiver 2000 and the IoT system 10.

(4) Also, if the situation turns into a condition not suitable for power transfer, the transmitter 1000 may remove the power signal and return to the standby phase. And, if the receiver 2000 is removed from the charging area and placed again in or is returned to the charging area, the cycle described above may be restarted.

(4-1) Also, depending on the charging state of the load 2500 of the receiver 2000, the transmitter 1000 may return to the identification phase to provide, to the receiver 2000, charging power adjusted based on the state information of the load 2500.

(5) In some embodiments, if the transmitter 1000 transitions from the power transfer phase to the standby phase as in the case where the receiver 2000 enters the charging area again after being removed from the charging area, the transmitter 1000 may transmit its status information to the IoT system 10.

(5-1) Also, depending on the charging state of the load 2500 of the receiver 2000, the transmitter 1000 may return to the identification phase to provide, to the receiver 2000, charging power adjusted based on the state information of the load 2500. And, the transmitter 1000 may retransmit, to the IoT system 10, identification information received from the receiver 2000 according to re-identification. In another aspect, if it is determined that the re-identification phase has occurred within a preconfigured time period, the transmitter 1000 may not transmit the identification information received during the re-identification process to the IoT system 10.

[End of Charge (EOC) Phase]

(1) If the transmitter 1000 receives information indicating completion of charging from the receiver 2000 or the transmitter 1000 detects ongoing full charging of the load 2500 or the transmitter 1000 receives information that the temperature of the receiver 2000 has increased to more than a preconfigured temperature, the transmitter 1000 may move to the end of charge phase.

(2) If the transmitter 1000 receives charging completion information from the receiver 2000 or right after the transmitter 1000 detects ongoing full charging of the load 2500 or if a preconfigured time has passed after detection of ongoing full charging of the load 2500, the transmitter may stop power transfer. And then the transmitter 1000 may stand by for a predetermined time period. After the predetermined time elapses, the transmitter 1000 may enter the digital ping phase to be connected to the receiver 2000 disposed in the charging area.

(3) If the transmitter 1000 receives, from the receiver 2000, a signal indicating that the temperature of the receiver 2000 has exceeded a preconfigured temperature, the transmitter 1000 may stand by for a predetermined time period. After the predetermined time elapses, the transmitter 1000 may enter the digital ping phase to be connected to the receiver 2000 disposed in the charging area.

(4) Also, the transmitter 1000 may monitor whether the receiver 2000 is removed from the charging area for a predetermined time period. If the receiver 2000 is removed from the charging area, the transmitter 1000 may return to the standby phase.

Third Embodiment of the Transmitter Operation

Figure 12:
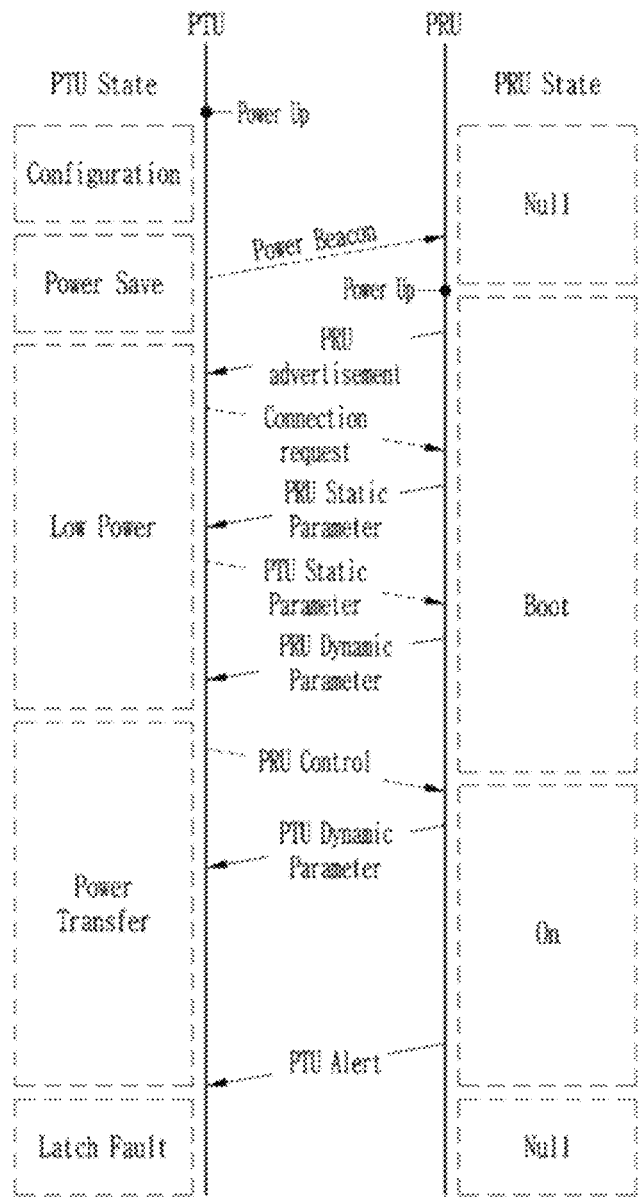

FIG. 12 is a flow diagram illustrating a method for establishing a connection between an IoT system and a wireless charging receiver. FIG. 12 is an action diagram based on operation phases of a transmitter according to a third embodiment of the present disclosure.

Referring to FIG. 12, according to the third embodiment of the present disclosure, a transmitter 1000 may have at least 1) configuration mode, 2) power save mode for object detection, 3) low power mode, 4) power transfer mode, and 5) latch fault mode.

[Configuration Mode]

(1) If the transmitter 1000 is powered up, the transmitter 1000 may enter the configuration mode.

(2) The transmitter 1000 may perform a self-check of the system.

(3) The transmitter 1000 may keep the current (Itx_in) applied to the transmitter-side coil 1400 under a specific current value (for example, 20 mArms). If the input current (Itx_in) of the transmitter-side coil 1400 is larger than a specific or preset current value, the input current (Itx_in) of the transmitter-side coil 1400 may be reduced to below the specific current value within a specific or preset time period (for example, 500 ms) after the transmitter 1000 enters the configuration mode.

(4) The transmitter 1000 may enter the power save mode within a specific or preset time period (for example, 4 s) after entering the configuration mode.

[Power Save Mode: Object Detection Step S110]

(1) In the power save mode, the transmitter 1000 may apply different power beacons for object detection to the transmitter-side coil 1400 at the respective time periods.

(2) The power beacons for object detection may include short beacons and long beacons. A short beacon may have an amount of power required for detecting various types of receivers 2000. A long beacon may have an amount of power required for driving the communication and control unit 2600 of the receiver 2000. The long beacon may have an amount of power capable of developing voltage in the receiver 2000, which is large enough to induce a response of the receiver 2000. The short beacon may have a first period, and the long beacon may have a second period. The short beacon may include a plurality of short beacons with a different amount of power, where the long beacon may include a plurality of long beacons with a different amount of power.

(3) The transmitter 1000 may detect existence of an object by detecting change in or variation of reactance and/or resistance of the input impedance (Ztx_in) of the transmitter-side coil 1400 and the transmitter-side impedance matching unit 1300 and/or change in or variation of the input impedance (Ztx_in) while applying the short beacon.

(4) If the transmitter 1000 detects the change in the reactance or resistance of the input impedance (Ztx_in) or the change in the input impedance (Ztx_in), the long beacon may be applied immediately.

(5) The long beacon of the transmitter 1000 may be used to drive the receiver 2000, and the transmitter 1000 may perform communication with the receiver 2000 based on a predetermined scheme. And, if the transmitter 1000 receives an advertisement from the receiver 2000, the transmitter 1000 may enter the low power mode.

(6) If the transmitter 1000 does not detect the change in the input impedance (Ztx_in) itself or reactance or resistance of the input impedance (Ztx_in), the transmitter 1000 may maintain the power save mode.

(7) Also, if the transmitter 1000 detects the change in the input impedance (Ztx_in) itself or reactance or resistance of the input impedance (Ztx_in), the transmitter 1000 may determine the existence of an object within the charging area and move to the low power phase.

[Low Power Mode: Receiver Detection and Recognition Step S120, S130, Receiver Identification Step s140, Charging Connection and IoT Connection Establishment Step S150]

(1) In the low power mode, the transmitter 1000 and the receiver 2000 may be connected to each other through a predetermined communication scheme (for example, Bluetooth Low Energy (BLE)) to transmit and receive data required for authentication to and from each other. And, based on the connection, the receiver 2000 may subscribe or be connected to to a wireless power network supervised or controlled by the transmitter 1000. And, the transmitter 1000 may enter the power transfer mode. The transmitter 1000 may detect an object located on a transfer pad by using a beacon signal and determine whether the object is a device capable of receiving wireless power. The beacon signal may use the short beacon or the long beacon. The transmitter 1000 may output a long beacon signal (S120), and the receiver 2000 (or receiver-side communication and control unit) which receives the long beacon signal may be woken up (or powered up) and transmit a PRU advertisement to the transmitter 1000.

(2) The transmitter 1000, which has received the PRU advertisement from the receiver 2000, may provide or form a connection between the transmitter 1000 and the receiver 2000 by transmitting a connection request signal to the receiver 2000 (S130).

2-1) If receiving the connection request signal from the transmitter 1000, the receiver 2000 may transmit receiver parameter information to the transmitter 1000 (or the transmitter 1000 may read or retrieve the information from the receiver 2000) (S140), and the transmitter 1000 may also transmit transmitter parameter information to the receiver 2000 (or the transmitter 1000 may write or store the information on the receiver 2000). The receiver parameter information is information about output voltage (Vrect) of the receiver-side AC/DC converting unit 2300, which includes the minimum output voltage (Vrect_min), maximum output voltage (Vrect_max), and optimal output voltage (Vrect_set). For example, the optimal output voltage (Vrect_set) may be one of voltage values ranging between the minimum output voltage (Vrect_min) and the maximum output voltage (Vrect_max).

2-2) More specifically, the transmitter may receive a receiver static parameter from the receiver 2000. The receiver static parameter is a signal indicating the status of the receiver 2000, which may be pre-fixed status information. The receiver static parameter may include receiver unique information, selective field information, protocol information, information about output voltage (Vrect) of the receiver-side AC/DC converting unit 2300, and information about output power of the receiver-side AC/DC converting unit 2300. And, the receiver static parameter may constitute at least part of the charging authentication information, and the receiver unique information in the receiver static parameter may become the IoT authentication information.

2-3) The transmitter 1000 which has received the receiver static parameter may transmit a transmitter static parameter (PTU static parameter) to the receiver 2000. The transmitter static parameter may be a signal indicating capability of the transmitter 1000.

2-4) The transmitter 1000 may receive a receiver dynamic parameter (PRU dynamic parameter) from the receiver 2000. The dynamic parameter is information that may be changed according to the status of the receiver 2000. The receiver dynamic parameter may include at least one parameter information measured at the receiver 2000. For example, the receiver dynamic parameter may include information about output voltage (Vrect) of the receiver-side AC/DC converting unit 2300. And the receiver dynamic parameter including a voltage configuration value re-adjusted according to a wireless charging condition may be provided to the transmitter 1000, and based on the received receiver dynamic parameter, the transmitter 1000 may update a receiver control table on a registry and the voltage configuration value initially set by the receiver static parameter according to the condition. At this time, the transmitter 1000 may control power transfer based on a recently updated configuration value. And the receiver dynamic parameter may constitute at least part of the charging authentication information.

2-5) The receiver dynamic parameter may include selective field information, output voltage of the receiver-side AC/DC converting unit 2300, minimum output voltage (Vrect_min_dyn) of the receiver-side AC/DC converting unit 2300, maximum output voltage (Vrect_max_dyn) of the receiver-side AC/DC converting unit 2300, optimal output voltage (Vrect_set_dyn) of the receiver-side AC/DC converting unit 2300, output current information of the receiver-side AC/DC converting unit 2300, output current information of the DC/DC converting unit 2400 of the receiver 2000, temperature information, and PRU alert information.

2-6) The PRU alert information may include information about over-voltage, overcurrent, over-temperature, charge complete, TA detect, SA/NSA mode transition, and restart request.

(3) The transmitter 1000 transmits the received IoT authentication information to the IoT system 10 to support the receiver 2000 to subscribe or be connected to the IoT system 10. If receiving a receiver static parameter, the transmitter 1000 may immediately output the IoT authentication information. In some embodiments, if the power transfer mode is determined, the transmitter 1000 may transmit the IoT authentication information immediately to the IoT system 10. By making the IoT authentication information transmitted to the IoT system 10 after transition to the power transfer mode is determined, this operation may prevent the connection by an arbitrary receiver that is not allowed to be charged wirelessly from subscribing to the IoT system 10 through the transmitter 1000. Furthermore, this operation may allow the receiver 2000 to subscribe or connected to to the IoT system 10 in conjunction with various characteristics of the transmitter 1000. For example, if the receiver 2000 is limited to be charged by a specific transmitter, it may be configured so that only receivers of a limited range of types are allowed to be subscribed or connected to the IoT system 10 through the corresponding transmitter.

(4) If an object located within the charging area is a metallic foreign object rather than the receiver 2000, it is not possible to perform data transmission and reception between the transmitter 1000 and the object. Therefore, since the transmitter 1000 is unable to receive a response from the object for a preconfigured time period, the transmitter 1000 may determine the object as a foreign object and enter the latch fault mode.

[Latch Fault Mode]
(1) In case the transmitter 1000 enters the latch fault mode, the transmitter 1000 may periodically apply a short beacon to the transmitter-side coil unit 1400 (namely transmit the short beacon to the receiver 2000).

(2) If the transmitter 1000 detects a change in input impedance (Ztx_in) itself and/or a change in reactance and/or resistance of the input impedance (Ztx_in) via the short beacon, the transmitter 1000 may determine that the object has been removed or the object has left the charging area and enter the configuration phase.

(3) If the transmitter 1000 does not detect the change in the input impedance (Ztx_in) itself or the change in reactance or resistance of the input impedance (Ztx_in) via the short beacon, the transmitter 1000 determines that the object has not been withdrawn yet and inform a user that the current status of the transmitter 1000 is an error status. Accordingly, the transmitter 1000 may include an output unit which generates a notification like a lamp or an alarm sound.

(4) Meanwhile, the latch fault mode may support various conditions for entering the latch fault mode in addition to the case where an object is a foreign object. For example, in the case of the error status corresponding to alarm information, the transmitter 1000 may be allowed to enter the latch fault mode.

[Power Transfer Mode: Wireless Charging Step S160]
(1) The transmitter 1000 may enter the power transfer mode and output receiver control information (PRU control) based on the parameter information received from the receiver 2000. The receiver control information (PRU control) may include information that enables/disables charging of the receiver 2000 and permission information. If the transmitter 1000 is capable of providing power large enough to charge the receiver 2000, the transmitter 1000 may output the receiver control information (PRU control) including the enable information.

(2) The transmitter 1000 may provide the receiver control information (PRU control) to the receiver 2000 periodically or when it is necessary to change the status of the receiver 2000 or both. And, the receiver 2000 may change its status based on the receiver control information (PRU control) and output the receiver dynamic parameter to the transmitter 1000 to report or update the status of the receiver 2000. For example, the receiver control information (PRU control) may include adjustment information to change the maximum power value (P_max) of the receiver 2000. Accordingly, the receiver 2000 may adjust at least one of required voltage/current information or optimal output voltage (Vrect_set_dyn) of the receiver-side AC/DC converting unit 2300 and transmit changed information to the transmitter 1000.

In another embodiment, the receiver control information (PRU control) may include adjustment information to change information about the output voltage (Vrect) of the receiver-side AC/DC converting unit 2300 of the receiver 2000. Accordingly, the receiver 2000 may adjust required voltage/current information or optimal output voltage (Vrect_set_dyn) of the receiver-side AC/DC converting unit 2300 or output voltage (Vrect) and transmit information about the adjustment to the transmitter 1000.

(3) Charging of the receiver 2000 is allowed, and power may be transmitted from the transmitter 1000 to the receiver 2000. The transmitter 1000 may receive the receiver dynamic parameter periodically from the receiver 2000. The receiver dynamic parameter may include wireless power receiver status and temperature information.

(4) Meanwhile, the receiver control information may include information for controlling output voltage (Vrect) of the receiver-side AC/DC converting unit 2300 of the receiver 2000.

(5) Meanwhile, if the transmitter 1000 detects ongoing full charging of the load 2500, the transmitter 1000 may stop power transfer regardless of reception of information about full charging of the load 2500 from the receiver 2000.

The embodiments of the present disclosure described above may be implemented in the form of program commands which may be executed through various types of computer components and recorded in a computer-readable recording medium. The computer-readable recording medium may include program commands, data files, and data structures separately or in combination thereof. The program commands recorded in the medium may be those designed and composed specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine code such as those generated by a compiler but also high-level language code which may be executed by a computer through an interpreter and the like. The hardware device may be composed to be operated by one or more software modules to perform the operations of the present disclosure, and vice versa.

Specific implementation of the present disclosure are embodiments, which does not limit the technical scope of the present disclosure in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of this document but has to be defined by the appended claims.

Various embodiments of the present disclosure may provide a device, a method, and a system for establishing a connection between a wireless charging receiver and an IoT system which may enhance convenience of performing network connection and configuration for interaction between various devices within the IoT system and a new device.

Also, some embodiments of the present disclosure may provide a device, a method, and a system which, when various battery-operated devices are charged wirelessly, may connect other devices linked to the various devices seamlessly and thereby allow an IoT system to be implemented and used conveniently.

Also, certain embodiments of the present disclosure may provide a device, a method, and a system capable of comprehensively managing heat generated in a receiver due to wireless charging and heat generated during the performance of various functions in conjunction with an IoT system.

Also, some embodiments of the present disclosure may allow to conveniently configure whether to establish interworking between a device requiring security authentication among various devices within an IoT system and a receiver.

Also, certain embodiments of the present disclosure may establish various smart environments by linking subscription to a wireless charging network to subscription to an IoT system network.

The technical effects of the present disclosure are not limited to the technical effects described above, and other technical effects not mentioned herein may be understood clearly from the description above.

What is claimed is:

1. A transmitter for wireless charging power transmission, comprising:
   a transmitter-side power convertor converting a first Alternating Current (AC) signal to a second AC signal for power conversion;
   a transmitter-side resonant circuit generating a magnetic field based on the second AC signal, converted by the transmitter-side power convertor, to provide power to a receiver located within a charging area; and
   a transmitter-side processor controlling the power conversion of the transmitter-side power convertor and matching impedance between the transmitter-side resonant circuit and the receiver, wherein the transmitter-side processor is configured to:
   detect an object located within the charging area,
   generate a wireless power signal and output the generated wireless power signal to the transmitter-side power convertor,
   recognize the object as the receiver if modulation of the wireless power signal associated with the object is detected,
   receive identification information of the receiver, wherein the identification information of the receiver transmitted from the receiver to the transmitter includes: charging authentication information for authenticating the receiver to establish wireless charging connection between the receiver and the transmitter, and an Internet of Things (IoT) authentication information for authenticating the receiver to join an IoT system,
   establish a connection to the receiver for wireless charging power transmission based on the charging authentication information included in the identification information of the receiver,
   transmit the IoT authentication information of the receiver included in the identification information of the receiver to the IoT system so that the transmitter supports the receiver to join the receiver to the IoT system by transmitting the IoT authentication information of the receiver to the IoT system, and
   transmit wireless charging power to the receiver,
   wherein the transmitter-side processor detects the object by monitoring change in magnetic flux in the charging area, change in capacitance and/or inductance between the object and the transmitter, and/or shift of resonance frequency between the object and the transmitter.

2. The transmitter of claim 1, wherein the transmitter-side processor detects change in power for generating the wireless power signal in the transmitter-side power convertor and detecting the object located within the charging area.

3. The transmitter of claim 1, wherein the transmitter-side processor recognizes the object as the receiver by acquiring a power control message from demodulation of a modulation signal of the wireless power signal received from the object.

4. The transmitter of claim 1, wherein, the transmitter-side processor controls a display of the receiver and/or an operation of the receiver in response to a temperature of the charging area.

5. The transmitter of claim 1, wherein the transmitter-side processor transmits IoT authentication information and security authentication information to the IoT system so that at least part of functions associated with connection of the receiver to a predetermined device within the IoT system or associated with interaction between the receiver and the predetermined device are activated.

6. A transmitter for wireless charging power transmission, comprising:
   a transmitter-side power convertor converting a first Alternating Current (AC) signal to a second AC signal for power conversion;
   a transmitter-side resonant circuit generating a magnetic field based on the second AC signal, converted by the transmitter-side power convertor, to provide power to a receiver located within a charging area; and
   a transmitter-side processor controlling the power conversion of the transmitter-side power convertor and performing impedance matching between the transmitter-side resonant circuit and receiver, wherein the transmitter-side processor is configured to:
   detect an object by transmitting a short beacon signal periodically,
   transmit a long beacon signal for driving the object,
   recognize the object as the receiver by receiving from the object a response signal which has been transmitted in response to reception of the long beacon signal,
   transmit a connection request signal to the receiver,
   exchange parameter information with the receiver which has received the connection request signal, wherein the parameter information includes: charging authentication information for authenticating the receiver to establish wireless charging connection between the receiver and the transmitter, and an IoT authentication information for authenticating the receiver to join an IoT system,
   establish a connection to the receiver for wireless charging power transmission based on the charging authentication information included in the parameter information received from the receiver,
   transmit to the IoT authentication information of the receiver included in the parameter information to the IoT system so that the transmitter supports the receiver to join the receiver to the IoT system by transmitting the IoT authentication information of the receiver to the IoT system, and
   transmit wireless charging power to the receiver,
   wherein the detecting of the object by transmitting the short beacon signal includes detecting the object by monitoring change in magnetic flux in the charging area, change in capacitance and/or inductance between the object and the transmitter, and/or shift of resonance frequency between the object and the transmitter.

7. The transmitter of claim 6, wherein the transmitter-side processor detects the object by detecting reactance or resistance of input impedance of the transmitter-side resonant circuit or change in the input impedance of the transmitter-side resonant circuit.

8. The transmitter of claim 6, wherein the transmitter-side processor transmits the IoT authentication information to the IoT system after establishing the connection for the wireless charging power transmission.

9. The transmitter of claim 6, wherein the parameter information includes static parameter information which is static status information indicating a status of the receiver and dynamic parameter information which is information changing depending on the status of the receiver, and the static parameter information includes the IoT authentication information.

10. The transmitter of claim 6, wherein the transmitter-side processor transmits the IoT authentication information and security authentication information to the IoT system so that at least part of functions associated with connection of the receiver to a predetermined device within the IoT system or associated with interaction between the receiver and the predetermined device are activated.

11. The transmitter of claim 6, wherein the transmitter-side processor controls a display of the receiver and/or an operation of the receiver in response to a temperature of the charging area.

12. A method for establishing a connection between an IoT system and a wireless charging receiver, comprising:
   detecting, by a transmitter, an object located within a charging area of the transmitter to transmit wireless charging power;
   outputting, by the transmitter, a receiver detection signal;
   receiving, by the transmitter, from the receiver a receiver confirmation signal which is a response signal to the receiver detection signal and recognizing the object as a receiver;
   identifying, by the transmitter, the receiver by receiving, from the receiver, identification information of the receiver including IoT authentication information for authenticating the receiver to join an IoT system and charging authentication information for authenticating the receiver to establish wireless charging connection between the receiver and the transmitter;
   establishing, by the transmitter, the wireless charging connection to the receiver based on the charging authentication information;
   transmitting, by the transmitter, the IoT authentication information of the receiver to a IoT management device so that the transmitter supports the receiver to join the receiver to the IoT system by transmitting the IoT authentication information of the receiver to the IoT system;
   transmitting, by the transmitter, the wireless charging power to the receiver,
   wherein the detecting of the object detects the object by monitoring change in magnetic flux in the charging area, change in capacitance and/or inductance between the object and the transmitter, and/or shift of resonance frequency between the object and the transmitter.

13. The method of claim 12, wherein, if a charging status of the receiver exceeds a preconfigured amount for charging, the transmitter transmits the IoT authentication information to the IoT system.

14. The method of claim 12, further comprising receiving, by the transmitter, security authentication information,
   wherein, the establishing, by the transmitter, the connection to the receiver comprises transmitting, by the transmitter, the IoT authentication information including the security authentication information to the IoT system, and the security authentication information includes information used by the receiver to establish a security connection to at least one device in the IoT system.

15. The method of claim 12, wherein the establishing, by the transmitter, the connection to the receiver comprises, if the transmitter determines that reception time of the security authentication information is within a preconfigured time from time that the receiver is detected, transmitting, by the transmitter, the IoT authentication information including the security authentication information to the IoT system.

16. The method of claim 12, wherein the establishing, by the transmitter, the connection to the receiver comprises, transmitting, by the transmitter, location information of the transmitter to the IoT management device to connect the receiver to at least one device selected based on the location information of the transmitter among a plurality of devices in the IoT system.

17. The method of claim 12, further comprising:
receiving, by the transmitter, a receiver connection request signal from the IoT management device; and
recognizing, by the transmitter, an other receiver and transmitting IoT authentication information corresponding to the other receiver to the IoT management device to allow the receiver to be connected to the other device in the IoT system.

18. The method of claim 12, further comprising:
monitoring, by the transmitter, a temperature of the receiver;
comparing, by the transmitter, the temperature of the receiver with a preconfigured first temperature value; and
if the temperature of the receiver exceeds the first temperature value, transmitting, by the transmitter, a control signal for stopping connection between the receiver and one or more devices in the IoT system to the IoT management device.

19. The method of claim 18, further comprising:
comparing, by the transmitter, the temperature of the receiver with a preconfigured second temperature value; and
if the temperature of the receiver exceeds the second temperature value, stopping, by the transmitter, wireless power transmission,
wherein the second temperature value is larger than the first temperature value.

\* \* \* \* \*